United States Patent

[11] 3,578,935

| [72] | Inventor | Clifford T. Deane<br>St. Albans, W. Va. |
|---|---|---|
| [21] | Appl. No. | 816,137 |
| [22] | Filed | Feb. 10, 1969 |
| [45] | Patented | May 18, 1971 |
| [73] | Assignee | Stampco, Inc. |

[54] AUTOMATIC DRUM-FORMING MACHINE
15 Claims, 35 Drawing Figs.

| [52] | U.S. Cl. | 219/64 |
|---|---|---|
| [51] | Int. Cl. | B23k 1/16 |
| [50] | Field of Search | 219/64, 59, 60, 61; 113/1 (E), 8, 7 (A) |

[56] References Cited
UNITED STATES PATENTS

| 1,624,213 | 4/1927 | Cameron | 113/8 |
| 2,047,964 | 7/1936 | Hothersall | 219/64 |
| 2,204,549 | 6/1940 | Murch | 219/64 |
| 2,236,848 | 4/1941 | Graham | 219/64 |
| 2,444,465 | 7/1948 | Peters | 219/64 |
| 3,069,530 | 12/1962 | Early | 219/64 |

*Primary Examiner*—J. V. Truhe
*Assistant Examiner*—R. Skudy
*Attorneys*—Clarence A. O'Brien and Harvey B. Jacobson

ABSTRACT: Sheet metal stock is initially formed into a cylinder by sequential cutting, bending and seam-welding operations. The cylinder then undergoes necking and flanging operations prior to transfer to a final assembly station at which a lid is applied and seamed to the cylinder as its wall is swaged. The cutting, welding and metal-deforming operations as well as transfer of the workpiece from one station to another is performed automatically by a hydraulic-electrical control system.

Clifford T. Deane
INVENTOR.

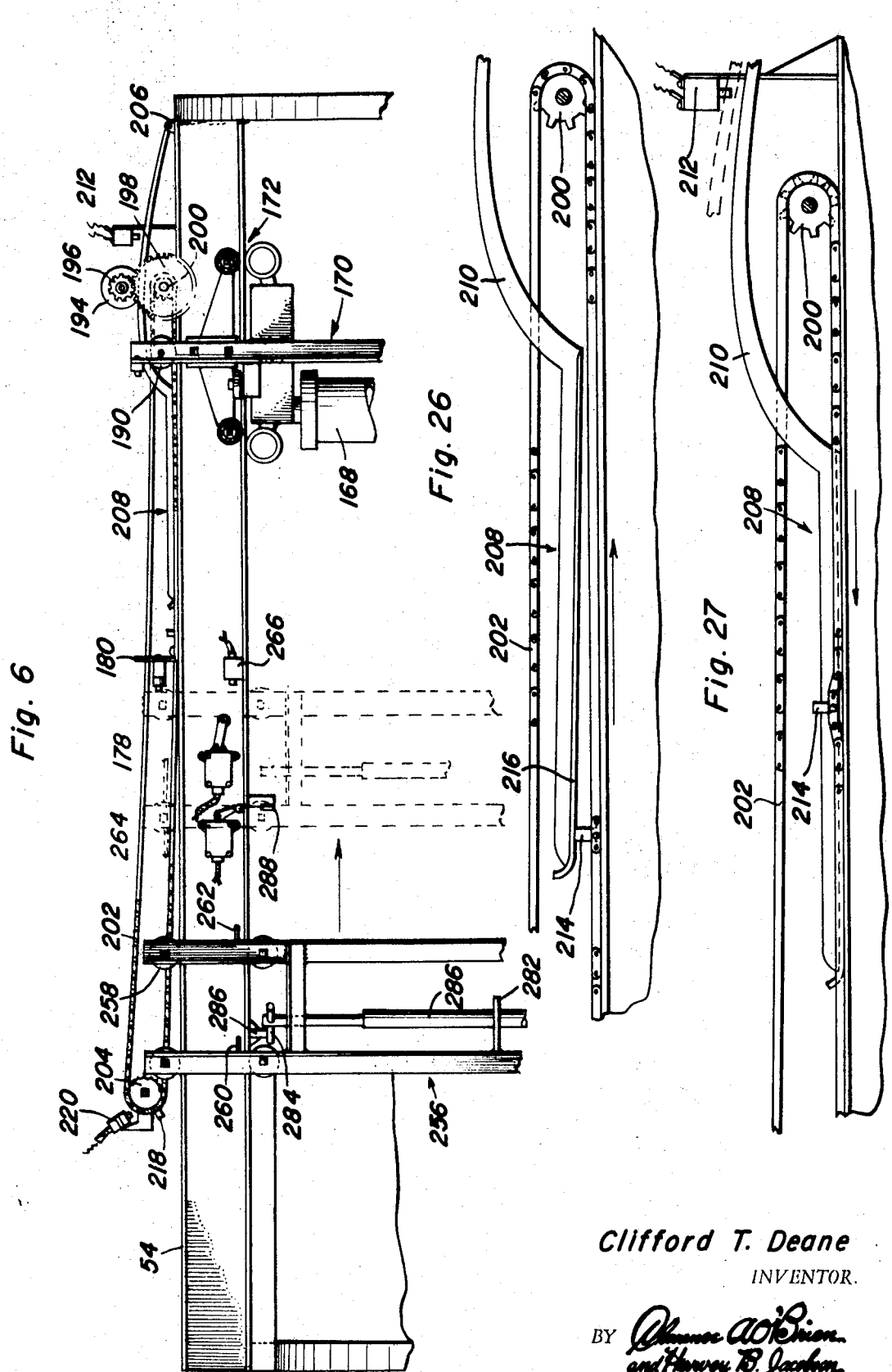

Patented May 18, 1971

Clifford T. Deane
INVENTOR.

BY
Attorneys

Patented May 18, 1971
3,578,935
13 Sheets-Sheet 8
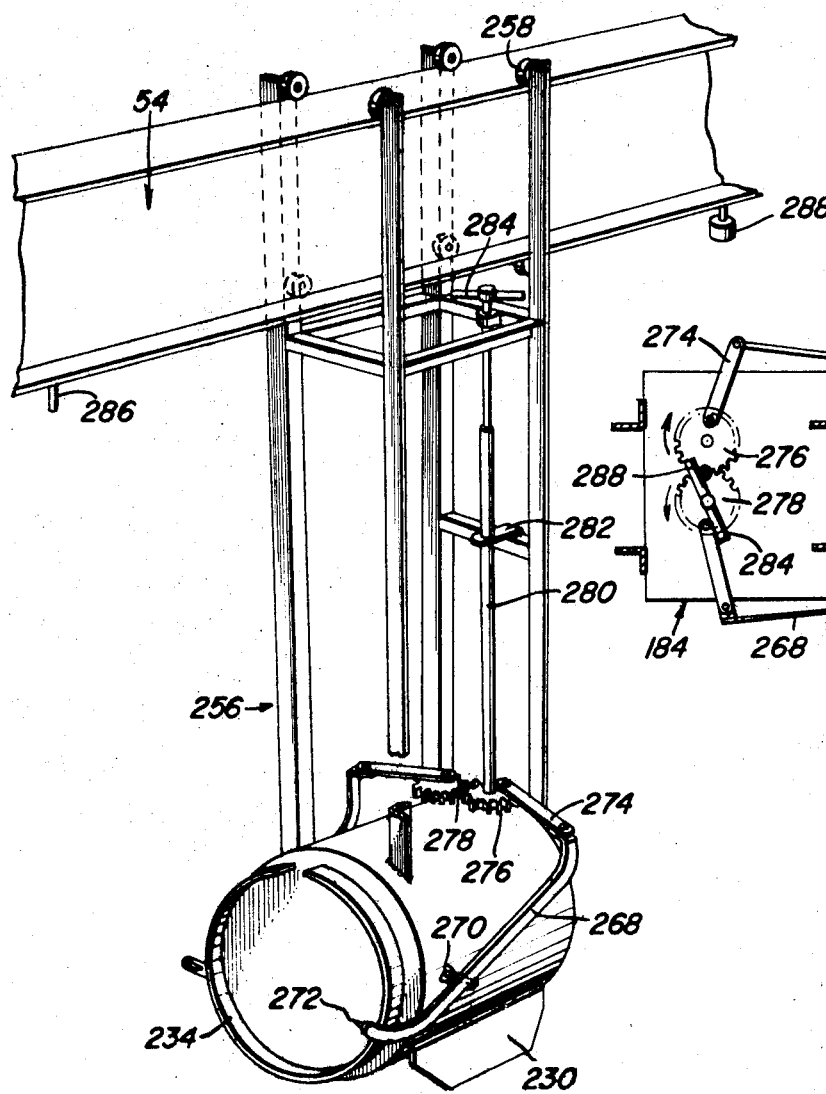
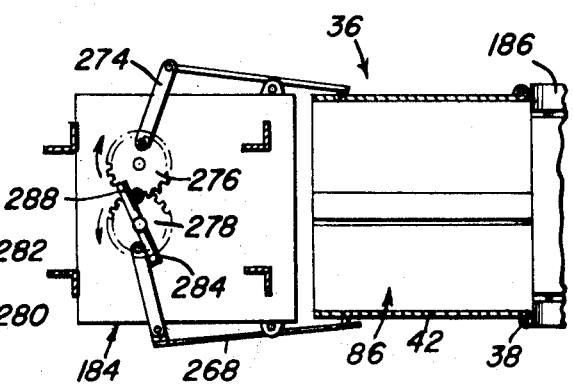
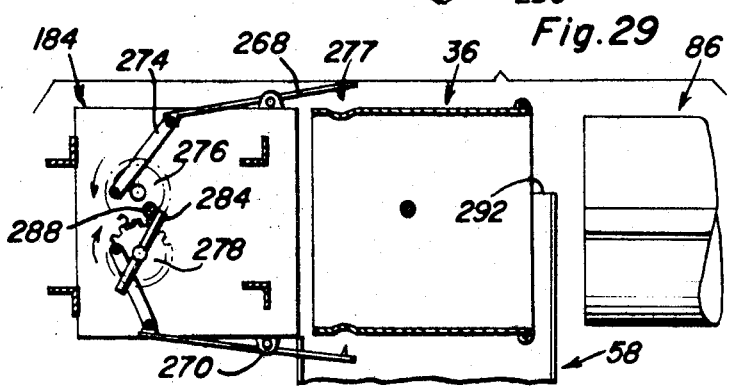
Clifford T. Deane
INVENTOR.
BY
Attorneys Clifford T. Deane
INVENTOR.

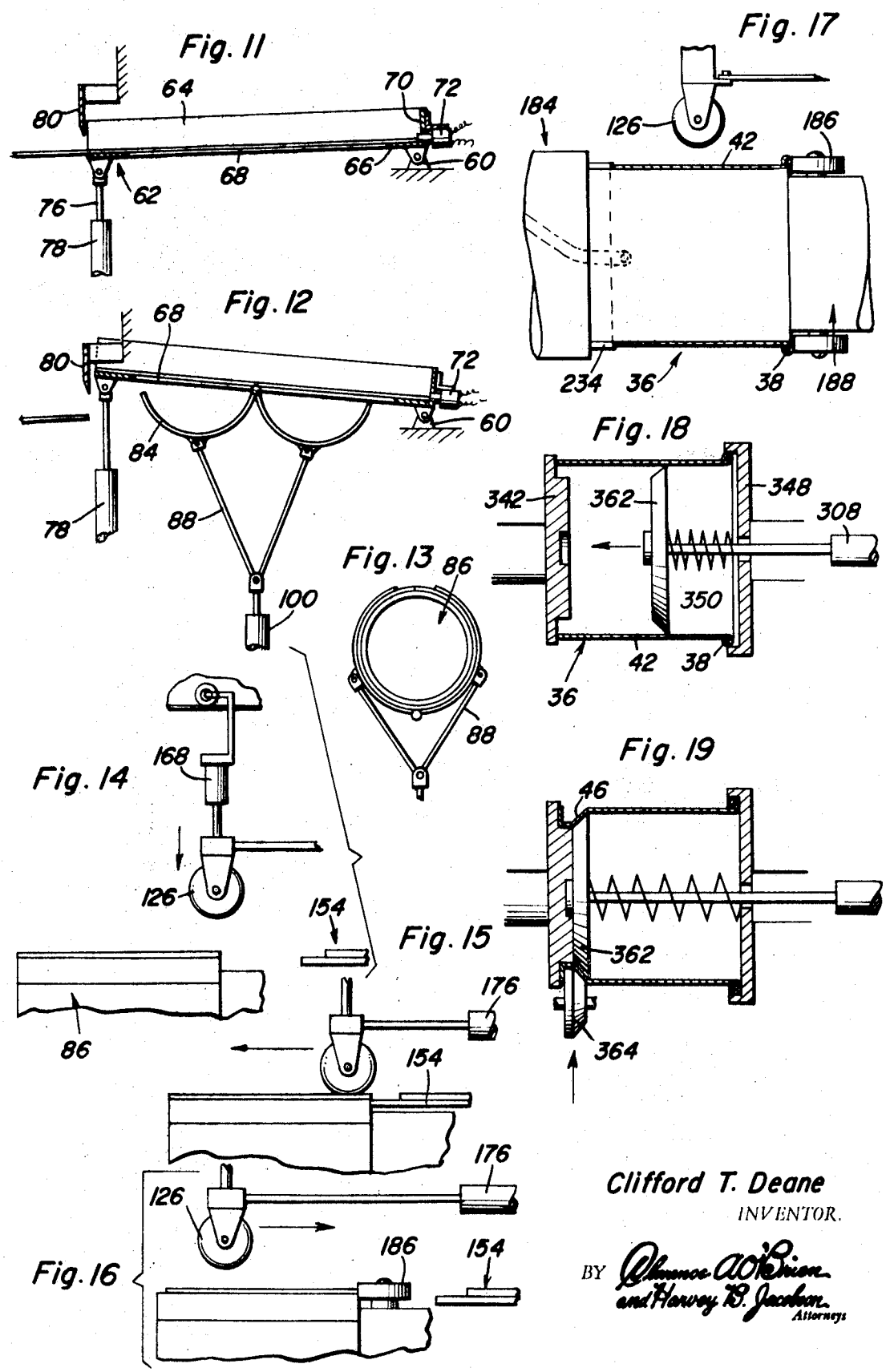

Clifford T. Deane
INVENTOR.

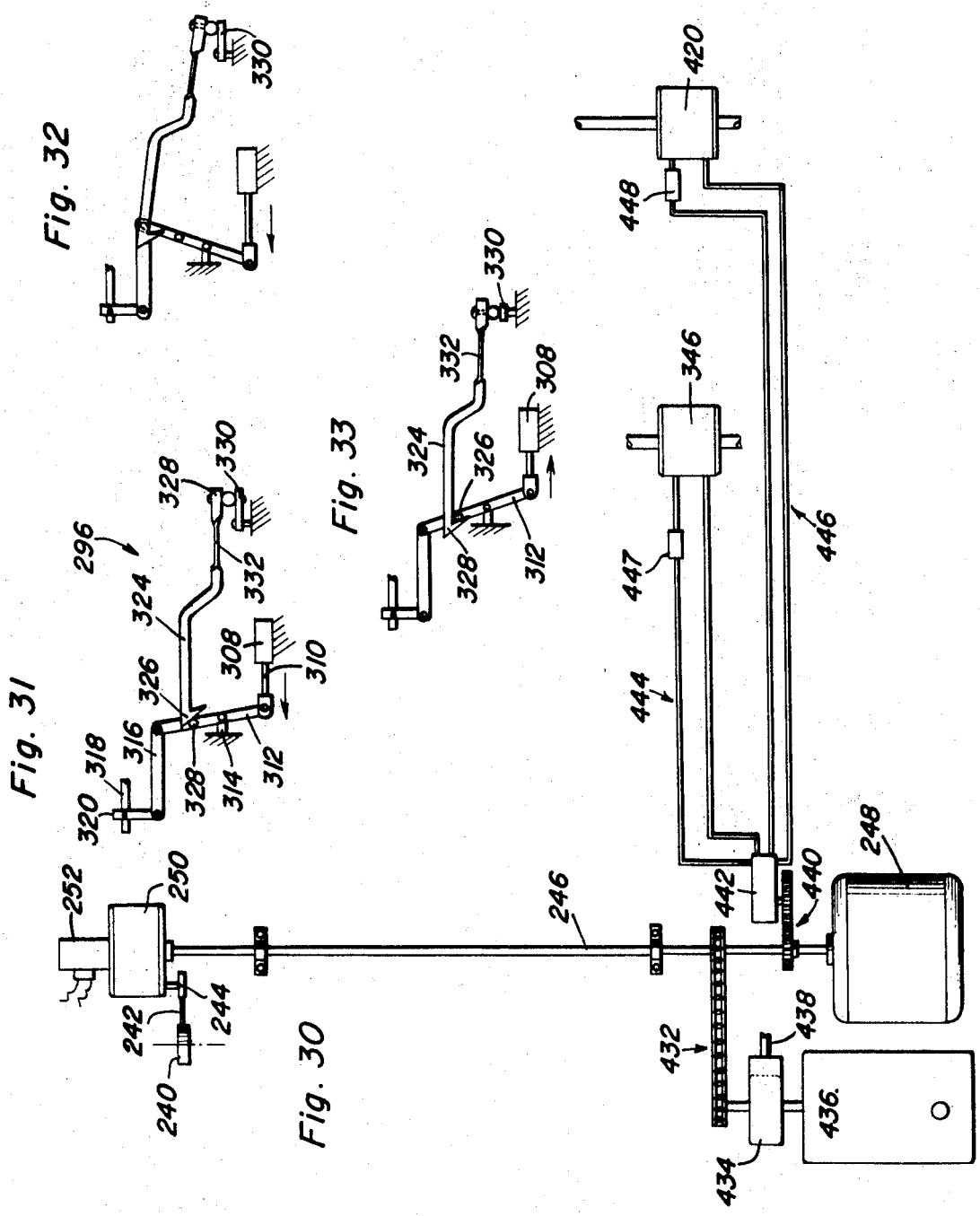

Clifford T. Deane
INVENTOR.

AUTOMATIC DRUM-FORMING MACHINE

This invention relates to the manufacture of tubular containers from sheet material such as sheet metal stock and in particular to the formation of metal drums or cans.

Although automatic machinery has heretofore been utilized in connection with metal-forming operations, complete automation has not been achieved in connection with the manufacture of a drum or can from sheet metal because of the seam welding and lid-seaming operations and the handling problem associated with the workpiece in its various stages of formation. It is therefore a primary object of the present invention to provide apparatus for forming a drum or can from sheet metal in a completely automatic fashion from beginning to end.

In accordance with the present invention, sequential formation of a workpiece from sheet stock including welding of a seam on the workpiece followed by material-deforming operations is performed on the workpiece at predetermined positions. Thus, the workpiece is sequentially positioned in a plurality of positions and material-deforming operations performed on the workpiece in each of the positions and in its final position assembled with another part. The automatic drum-forming machine therefore features interrelated stock-cutting, workpiece bending, seam-welding and end-beading components as well as an automatic, interrelated hydroelectric control system governing the sequential operations of the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 6 is a partial front elevational view of the upper portion of the first stage of the automatic machine;

FIG. 9 is a partial perspective view of a portion of the first stage of the automatic machine;

FIGS. 11 through 13 are diagrammatic illustrations showing various phases in the stock-cutting and workpiece-bending operations;

FIGS. 14 through 16 are diagrammatic illustrations of various phases in the seam-welding operation of the automatic machine;

FIG. 17 is diagrammatic illustration of a phase in the end-beading operation of the automatic machine;

FIGS. 18 and 19 are diagrammatic illustrations of two phases in the intermediate stage of the automatic machine wherein the workpiece is necked and flanged at an end opposite the previously beaded end;

FIG. 25 is a partial sectional view taken substantially through a plane indicated by section line 25-25 in FIG. 1;

FIGS. 26 and 27 are enlarged partial elevational views of a portion of the mechanism illustrated in FIG. 6;

FIGS. 28 and 29 are top sectional views of a portion of the mechanism illustrated in FIG. 9 in two different operational phases;

FIG. 30 is a simplified illustration of the drive arrangement associated with the automatic machine;

FIGS. 31 through 33 are diagrammatic illustrations of the workpiece ejector mechanism in various operational phases;

Figure 22:
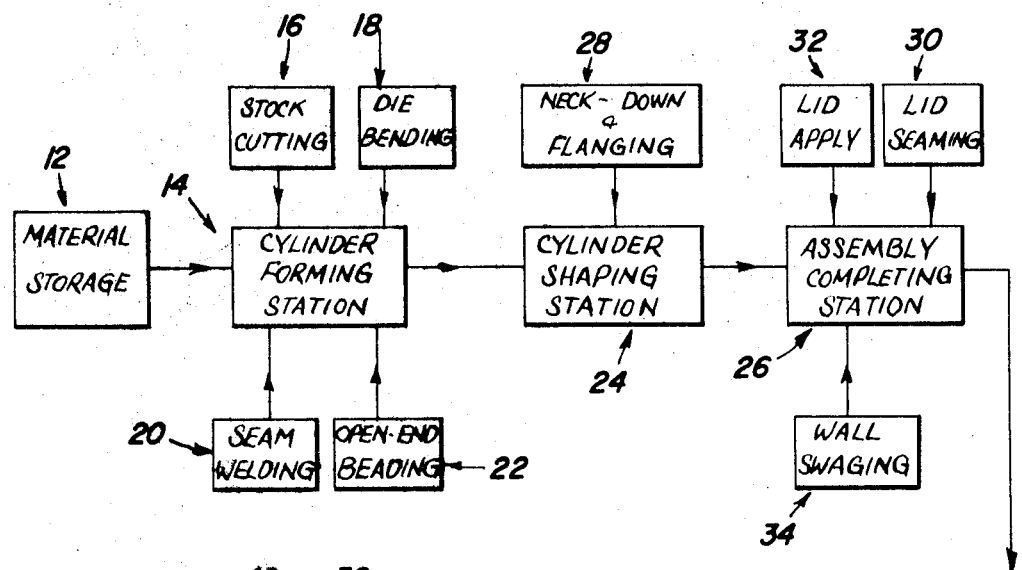
FIG. 22 is a work flow diagram illustrating the operations involved in the automatic machine.
Figure 23:
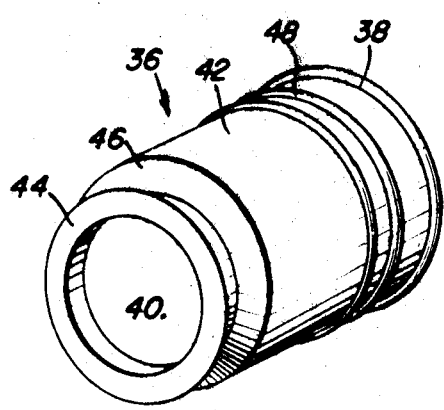
FIG. 23 is a perspective view of a completed workpiece or drum produced by the automatic machine of the present invention.

Referring initially to FIG. 22, the broad principles underlying the automatic operations performed by the machine of the present invention will become apparent. Thus, the machine of the present invention receives as the raw material, sheet metal stock from a material storage component 12 delivered to an initial workpiece-forming station at a stage generally referred to by reference numeral 14 wherein the sheet material is formed into a cylindrical workpiece by means of a stock-cutting operation 16 sequentially followed by a die-bending operation 18 and a seam-welding operation 20. A material-deforming operation 22 in the form of open end beading is performed on the workpiece at the cylinder-forming station prior to transfer therefrom so that the workpiece will be properly conditioned for rotational movement in an intermediate cylinder-shaping station at stage 24 and in the final assembly completing station at stage 26. In the intermediate stage, the workpiece is subjected to a necking and flanging operation 28 so that it may be prepared for assembly with a lid by a lid-seaming operation 30 at the final station after a lid is applied by means of the lid-applying operation 32. Also a workpiece wall swaging operation 34 is performed at the final station prior to the application and seaming of the lid to the workpiece. The final product is therefore delivered from the final stage 26 in the form of a completed workpiece generally referred to by reference numeral 36 as illustrated in FIG. 23.

The workpiece 36 includes at an open end thereof, a beaded portion 38 while at the opposite axial end of the cylinder portion 42, a recessed lid 40 is attached by means of a double seam portion 44 secured to a flanged neck down portion 46. Also formed on the cylindrical portion 42 of the workpiece, are a plurality of annular ribs or corrugations 48 formed by the wall-swaging operation so as to strengthen the cylindrical walls of the drum or workpiece. It should be appreciated however, that workpieces of different shapes and sizes may be produced by the automatic machine including workpieces on which some of the material deforming operations have been omitted or additional material deforming operations added.

Figure 1:
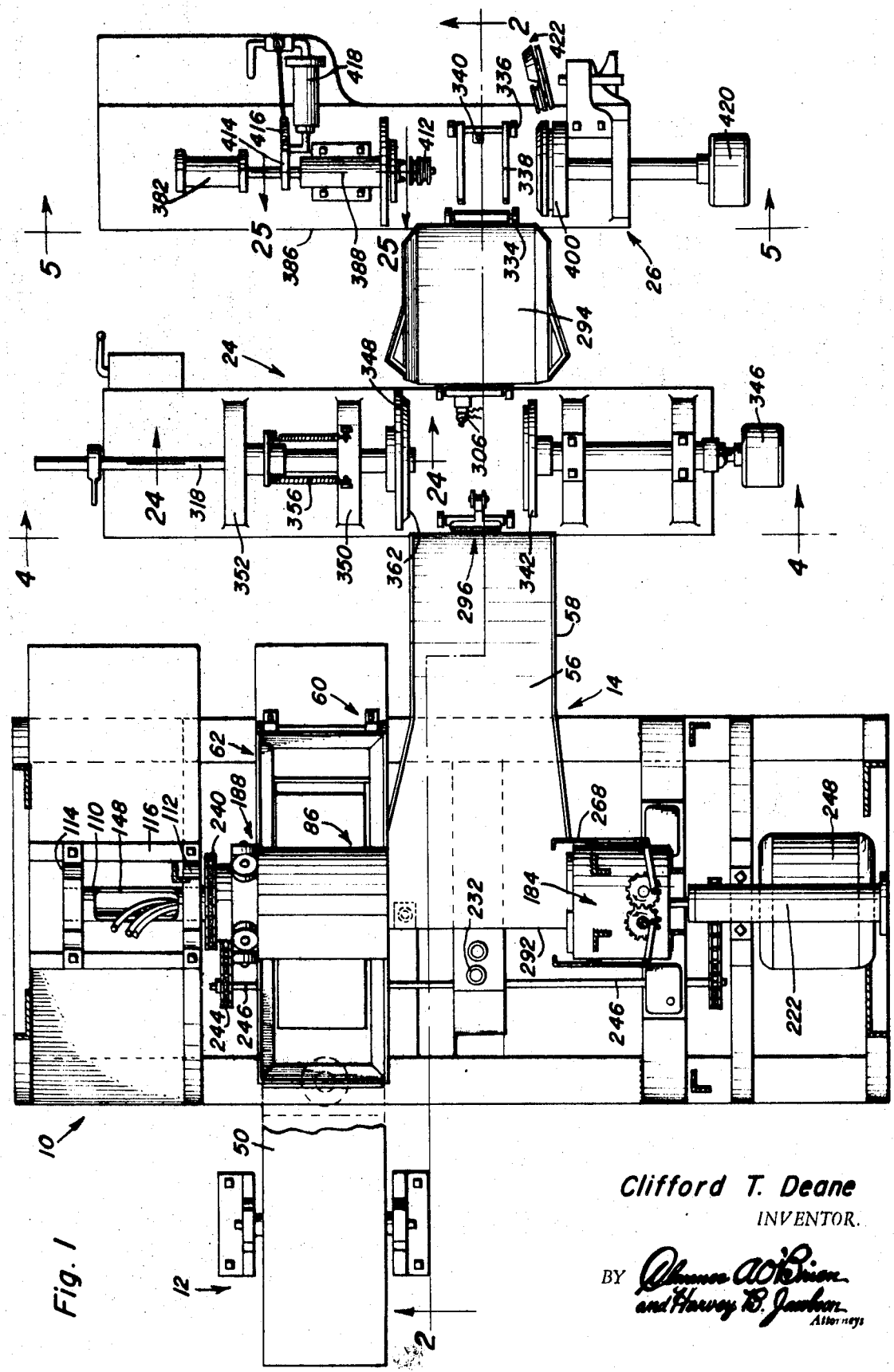
FIG. 1 is a top plan view of the automatic machine of the present invention.
Figure 2:
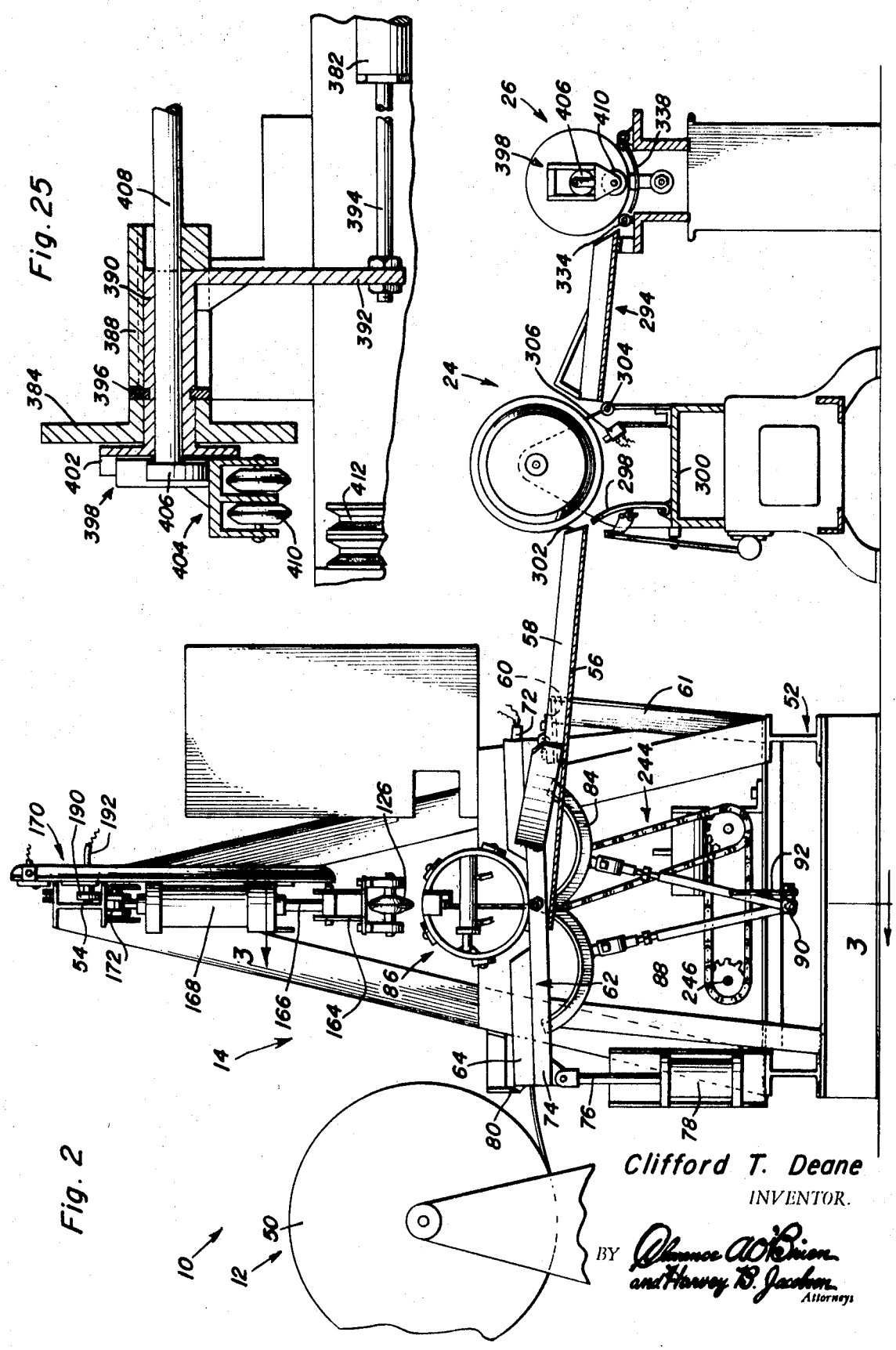
FIG. 2 is a side sectional view through the machine taken through a plane substantially indicated by section line 2-2 in FIG. 1.

Referring now to FIGS. 1 and 2, it will be observed that the automatic machine generally referred to by reference numeral 10 includes three sections or stages consisting of the initial stage 14, the intermediate stage 24 and the final stage 26 as referred to with respect to FIG. 22. The raw material in the form of sheet metal is accordingly supplied to the initial stage 14 from the material storage 12. The sheet metal is thus formed into a workpiece in the initial stage 14 wherein it is also subjected to a metal-deforming operation before being transferred to the intermediate stage 24 wherein it is again subjected to a metal-deforming operation prior to transfer to the final stage 26 wherein metal forming operations are performed and a lid added to complete the workpiece as depicted in FIG. 23. The sheet metal is thus fed in any suitable manner from the storage 12 into the initial stage 14 after which automatic operation begins until completion of the workpiece except for the supply of lids to the final stage or section 26.

INITIAL STAGE

As hereinbefore indicated, the initial stage or section 14 of the machine includes facilities for forming the workpiece into a cylindrical or tubular member from the sheet material supplied thereto from the material storage 12 which includes a rotatably mounted spool 50 of sheet metal intermittently displaced into the initial stage or section 14. All of the components of the initial stage are therefore mounted on a suitable base structure 52 to which upwardly projecting frame members are connected for supporting in spaced relation above the base structure 52, a supporting I-beam member 54 upon which other components of the initial stage are supported. It will be appreciated of course, that many different types of frame constructions may be utilized for fixed spaced support of the various components in the relative locations as to be hereafter described. Thus, the frame supports in a downwardly inclined position, a gravity feed passage 56 by means of which the workpiece formed within the initial stage 14 and operated thereon, may be transferred to the intermediate stage 24. The passage 56 is therefore provided with a pair of sidewalls 58 for confining the cylindrical workpiece at its opposite axial ends as it rolls down the incline of the passage from the central portion of the initial stage 14 toward the intermediate portion of the intermediate stage 24.

STOCK-CUTTING OPERATION

Figure 3:
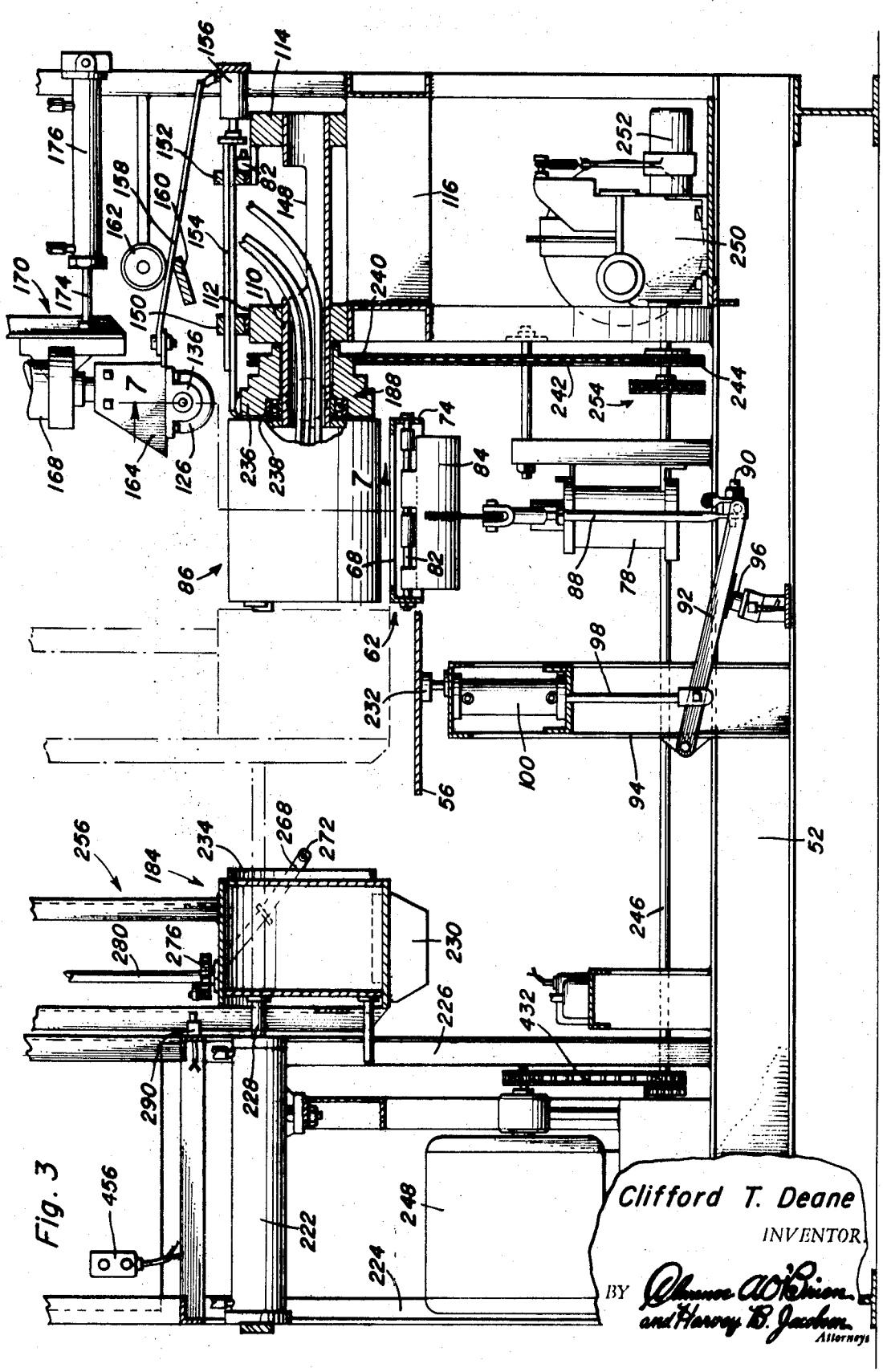
FIG. 3 is a partial sectional view taken substantially through a plane indicated by section line 3-3 in FIG. 2.

The first operation within the initial stage 14, is the cutting of the sheet metal fed thereto from the sheet metal spool 50 into flat blanks of predetermined length. Referring therefore, to FIGS. 2 and 3 in particular, it will be observed that a pivot bracket 60 is supported in spaced relation above the base structure 52 by the frame member 61 adjacent the discharge side of the initial stage and to one lateral side of the gravity feed passage 56. The pivot bracket 60 thus pivotally mounts a receiver 62 for upward displacement by a limited amount. The receiver 62 in its down position is therefore aligned with the lower portion of the sheet metal spool 50 so as to receive therewithin a predetermined length of sheet material between the spaced sidewalls 64 of the receiver. The receiver is provided with a bottom support portion 66 to which the spaced sidewalls 64 are connected, the bottom portion 66 being provided with an enlarged opening 68 for purposes to be hereafter explained as more clearly seen in FIGS. 11 and 12. Mounted on a rear backstop portion 70 of the receiver is a cutoff limit switch 72 the actuator of which projects through the backstop member 70 so as to be engaged by the leading edge of the sheet material fed into the receiver. Accordingly, when a predetermined length of sheet material is fed into the receiver and abuts against the limit switch 72, a cutoff signal is effected in order to upwardly displace the receiver about the pivot bracket 60. Accordingly, connected to a forward end of a forwardly depending apron portion 74 of the receiver, is the piston rod 76 of a hydraulic power cylinder device 78 which is fixedly mounted on the base structure 52 at the front of the initial stage. Also mounted on the front of the initial stage in fixed relation to the base structure 52, is a fixed blade member 80 arranged to shear the sheet material when the receiver 62 is upwardly displaced by the cylinder device 78 as clearly illustrated in FIGS. 11 and 12. Thus, a predetermined length of sheet material is cut off so that it may be bent into a cylindrical form by the following operation within the initial stage.

TUBULAR BENDING OPERATION

Pivotally mounted by the pivot shaft 82 that extends between the apron portions 74 of the receiver 62, as more clearly seen in FIG. 3, are a pair of semicircular bending die members 84. The die members are arranged to bend the sheet material, cut to its predetermined length within the receiver, about an expansible core assembly 86 fixedly located in spaced relation above the receiver. Connected to each of the bending die members 84, are a pair of adjustable link members 88 which are interconnected, by the link pin 90 at the lower ends of the link members, to a lever actuator 92 which is pivotally mounted above the base structure 52 by the frame standards 94. In the retracted position illustrated in FIG. 3, the lever actuator member 92 engages a die control limit switch 96 by means of which the sequence of operations which follow is assured. The lever actuator 92 is therefore connected by means of the connecting rod 98 to a hydraulic power cylinder device 100 arranged to retract the piston 98 and thereby upwardly displace the lever actuator 92 in order to close the semicircular bending die members 84 about the core assembly or mandrel 86 in order to bend the sheet material thereabout forming a cylinder having abutting edges as shown in FIGS. 12 and 13. It will therefore be appreciated, that when the receiver 62 is upwardly displaced for cutoff purposes by the cylinder device 78, the bending die members 84 and the sheet metal will be brought into closer proximity to the core assembly 86 so that the metal may thereafter be bent about the core assembly. Operation of the cylinder device 100 is therefore arranged to occur some predetermined time interval after operation of the cylinder device 78 so as to permit cutting of the sheet material before the bending operation occurs. It will also be appreciated, that when operation of the bending die cylinder device 100 occurs, the die control switch 96 will be released so as to start expansion of the expansible core assembly 86 which cooperates with the bending die members 84 in forming the cylindrical workpiece.

Figure 7:
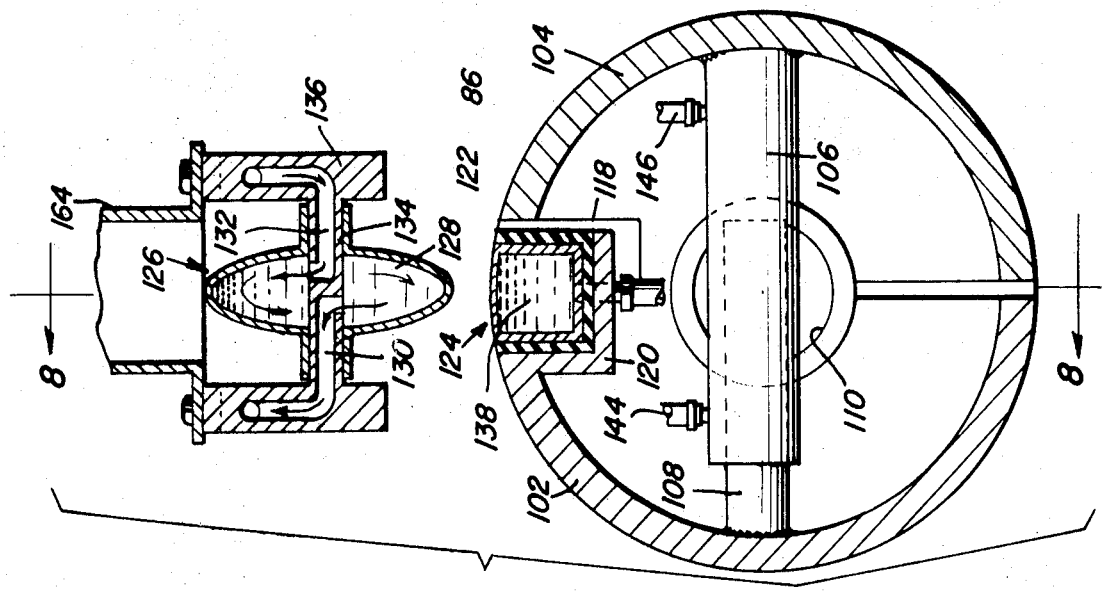
FIG. 7 is a partial enlarged sectional view taken substantially through a plane indicated by section line 7-7 in FIG. 3.

Referring now to FIGS. 2 and 7 in particular, it will be observed that the expansible core assembly 86 includes two semicylindrical sections 102 and 104. Secured to and located within the section 104 is a power cylinder device 106 from which a piston 108 extends, the piston being welded to the inside of the section 102 so that upon extension of the piston from the cylinder device 106, the core assembly 86 will be expanded. The core assembly is fixedly mounted in spaced relation above the receiver 62 by means of a tubular shaft 110 fixed as by welding to the core section 102 at one axial end thereof, the hollow shaft 110 being fixedly mounted between a pair of mounting blocks 112 and 114 which are fixed to a pair of frame members 116 supported in fixed and spaced relation above the base structure 52 adjacent one end of the initial stage 14, as more clearly seen in FIGS. 1 and 3. An upper portion of the core section 104 is recessed at 118 so as to receive the supporting projection 120 of the core section 102 in order to accommodate contraction and expansion of the core assembly. It will therefore become apparent that upon release of the control switch 96 which occurs when the bending die cylinder device 100 starts its movement, the core-expanding cylinder device 106 is set into operation for the purpose of expanding the core assembly as the predetermined length of sheet metal is being bent thereabout by the bending die members 84.

SEAM-WELDING OPERATION

Figure 8:
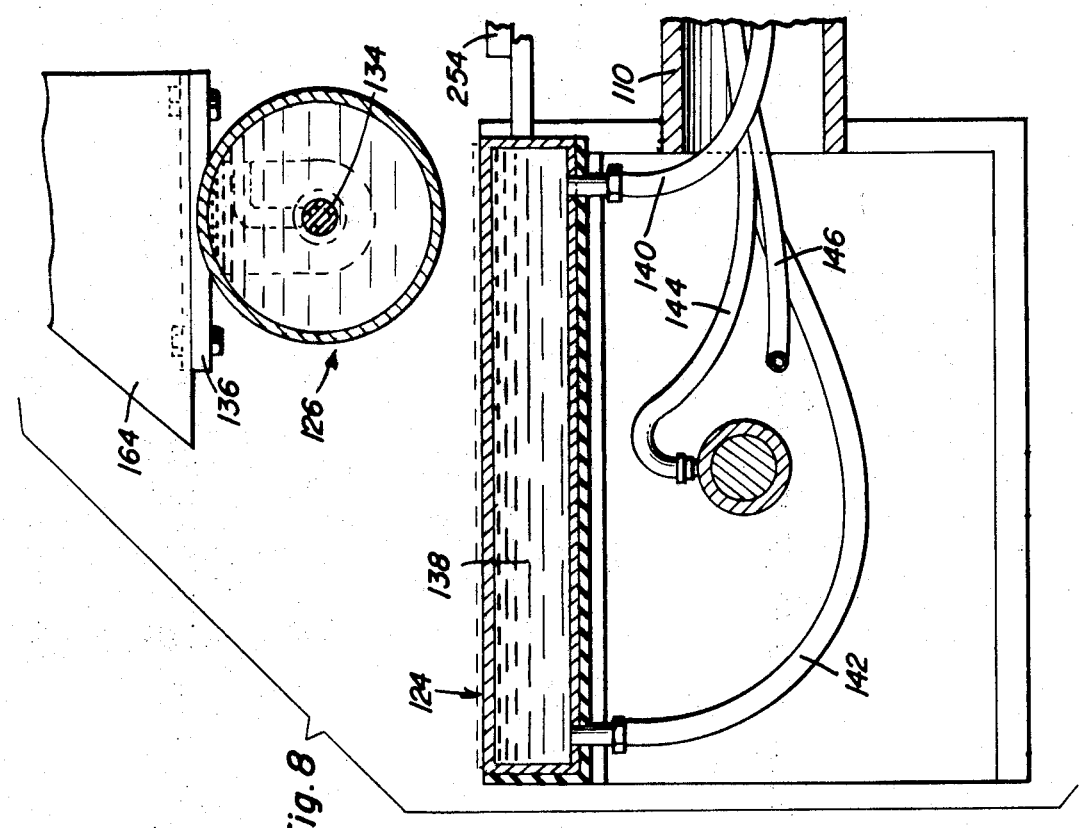
FIG. 8 is a partial sectional view taken substantially through a plane indicated by section line 8-8 in FIG. 7.

The abutting edges of the cylindrical workpiece formed about the core assembly 86, will be disposed in alignment with the supporting projection 120 of the core section 102. Accordingly, the supporting projection 120 is provided with a nonconductive channel member 122 within which there is fixedly mounted a coolant-containing anode element 124. Thus, the exposed surface of the anode element 124 supports the abutting edges of the cylindrical workpiece. Also aligned with the abutting edges and disposed above the anode element 124, is a rotatable cathode element 126 of the welding apparatus. It will be observed that the cathode element 126 has a hollow chamber 128 formed therein which communicates with passages 130 and 132 formed within a journal shaft 134 on which the cathode wheel 126 is rotatable, the shaft 134 being fixed between a pair of supporting bracket members 136 through which coolant is circulated as more clearly seen in FIG. 7. Also, it will be observed from FIGS. 7 and 8 that the anode element 124 fixed within the core assembly 86 is provided with a longitudinal chamber 138 through which coolant is circulated by means of the hoses 140 and 142 connected to opposite ends of the chamber 138. Also a pair of hoses 144 and 146 extend into the core assembly 86 together with the hoses 140 and 142 for supplying motivating fluid to the cylinder device 106. The hoses therefore extend out of the core assembly through the hollow shaft 110 and an opening 148 formed therein as more clearly seen in FIGS. 1 and 3.

In order to render the welding apparatus operative, an electrically conductive path must be established to the anode and cathode elements 124 and 126. Accordingly, a pair of sliding guides 150 and 152 made of nonconductive material, are mounted on the mounting blocks 112 and 114 for slidably mounting an anode contactor member 154 which is connected to a cylinder device 156 arranged to project the contactor member 154 into contact with the adjacent axial end of the anode element 124 as more clearly seen in FIG. 3. Electrical contact with the cathode element is maintained throughout by means of the conductor member 158 connected to the mounting bracket members 136 which support the cathode element, the conductor member 158 being maintained in electrical contact with the conductor 160 by means of a presser wheel 162 as more clearly seen in FIG. 3. The cathode element 126, however, must be closely positioned above the abutting edges of the workpiece when the welding apparatus is to begin welding the seam. Accordingly, the cathode-mounting brackets 136 are connected by the connector members 164 to the lower end of a piston rod 166 (FIG. 2) extended from and retracted within a positioning cylinder device 168 which is mounted on a carriage frame assembly 170. As more clearly seen in FIG. 6, the carriage frame assembly 170 has an upper pair of roller assemblies 172 supported on the lower flanges of the supporting eye beam 54 to guide slidable movement of the carriage assembly 170 therealong. In order to move the carriage assembly through its operating stroke during which time the abutting edges of the workpiece are welded, a piston rod 174 is connected to the lower end of the carriage assembly, the piston rod 174 projecting out of the carriage moving cylinder device 176. It will therefore become apparent that simultaneously with the actuation of the cylinder device 106 for expanding the core assembly 86, the anode contactor cylinder 156 is actuated together with the cathode-positioning cylinder device 168 in order to start the welding operation. Only after a predetermined delay period necessary to properly position the electrode elements of the welding apparatus and insure that the workpiece is held stationary by the core assembly 86 in its expanded condition, does the carriage assembly 170 begin its movement through the cylinder device 176. Also mounted on the support 54 for engagement by an upper end of the carriage frame assembly 170, is a welder carriage reverse switch 178 arranged to effect reverse movement of the carriage frame assembly 170 through its cylinder device 176 when it abuts stop 180 at the end of its stroke. The foregoing welding operation is also diagrammatically illustrated in FIGS. 14, 15 and 16. It will therefore become apparent that when the reverse carriage switch 178 is actuated not only is the movement of the carriage reversed, but the cathode element is withdrawn by the cathode-positioning cylinder device 168, the anode contactor 154 is withdrawn by the cylinder device 156, and the core assembly 86 contracted so that the welded workpiece may be released therefrom for the following operation thereon.

BEADING OPERATION

Figure 10:
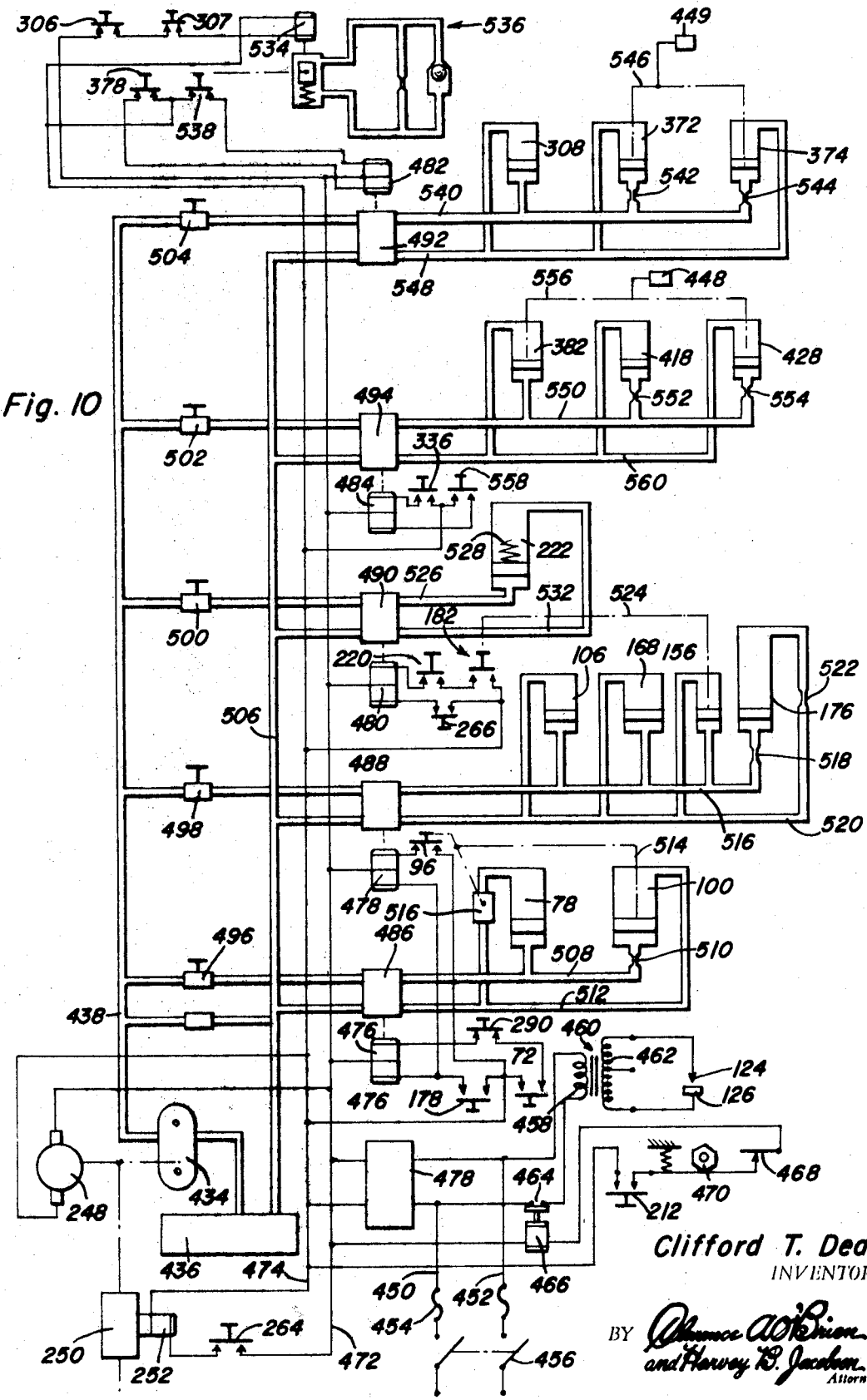
FIG. 10 is a control circuit diagram associated with the machine illustrated in FIGS. 1 through 9.

Referring initially to FIGS. 16 and 17, it will be observed that as the welding carriage moves the cathode element in a reverse direction, the anode contactor 154 is withdrawns as to stop welding current. Withdrawal of the anode contactor by its cylinder 156 is also operative through an interlock to release a normally closed beading interlock switch 182 as shown in FIGS. 3 and 10 in order to condition the machine for the beading operation. During the reverse movement of the welder carriage 170, a header assembly 184 is also actuated so as to axially engage one axial end of the workpiece forcing the opposite axial end of the workpiece against rotatable beading wheels 186 mounted on the beading assembly 188 as shown in FIG. 17. The beaded portion 38 at the open axial end of the workpiece 26 is thereby formed.

In order to control the referred to beading operations in the proper sequential manner, the welder carriage assembly 170 is provided adjacent the upper end thereof, with a traction drive wheel 190 as shown in FIGS. 2 and 6. The traction drive wheel 190 is operative in response to movement of the welder carriage 170, to ride upon the channel flange of the supporting beam 54 in order to impart rotational movement through any suitable transmission device such as the rotary shaft 192 to a driven gear assembly 194 having a pinion member 196 enmeshed with a gear member 198 to which a drive sprocket 200 is connected for driving a sprocket chain 202. The sprocket chain is therefore entrained about the drive sprocket 200 rotatably mounted above the supporting beam 54 and about a driven sprocket wheel 204 which is spaced from the drive sprocket wheel 200 in fixed relation thereto above the supporting beam 54 as seen in FIG. 6. It will therefore be appreciated that as the welder carriage 170 moves through its stroke, the sprocket chain 202 will be reciprocated back and forth in proportion thereto. Pivotally mounted by the pivot brackets 206 at one longitudinal end of the supporting beam 54, is a lever actuator generally referred to by reference numeral 208 which includes an arcuate portion 210 adapted to actuate a welding cycle switch 212 mounted in spaced relation above the supporting beam 54 adjacent to the lever actuator pivot bracket 206. In this manner, electrical power for the welding apparatus is cut off during the return movement of the welding carriage 170. A projection 214 is mounted on the lower run of the sprocket chain 202 for engaging a lower projecting flange portion 216 of the lever actuator 208 in order to displace the lever actuator in a clockwise direction with respect to the pivot bracket 206 as viewed in FIG. 6. Power is thereby cut off through the cycle switch 212 at the proper time during the reverse movement of the welder carriage. After the lever-displacing projection 214 moving in a reverse direction, drops off the lever flange portion 216, the lever 208 drops back in a counterclockwise direction so as to release the cycle switch 212. Thus, during the subsequent forward movement of the welder carriage 170, the lever actuator projection 214 on the sprocket chain will ride above the flange portion 216 of the lever 208 so as to avoid opening of the cycle switch 212 during this forward movement. At the end of the forward stroke of the welder carriage, the projection 214 on the flange will again be in a position to engage the underside of the flange portion 216 as shown in FIG. 26.

It will be further observed from FIG. 6, that the sprocket wheel 204 at the end opposite the drive sprocket 200 is provided with a switch-actuating projection 218 arranged to actuate and close a header control switch 220 in order to establish the control circuit previously conditioned by the closing of the beading cutoff switch by the anode contactor 154. Upon closing of the header control switch 220, a header-displacing cylinder device 222 is powered, the cylinder device 222 being fixedly mounted between the frame members 224 and 226 as shown in FIG. 3 rearwardly of the header assembly 184 so as to impart movement thereto through the piston rod 228 which extends therefrom. The header assembly is therefore coaxially aligned with the expansible core assembly 86 and with the workpiece 36 supported thereon so as to axially engage the workpiece as diagrammatically illustrated in FIG. 17. In order to accurately guide movement of the header assembly during its engagement with the workpiece pressing it against the beading wheel 186, a downwardly projecting guide member 230 is welded to one side thereof as more clearly seen in FIGS. 3 and 9. The guide member 230 is therefore arranged to move between the guide rollers 232 during the beading of the workpiece. The header 184 is also provided with an annular work-engaging portion 234 which fits over the expansible core assembly 86 for axially displacing the workpiece therealong into engagement with the beading wheels 186 on the beading assembly 188.

The beading assembly 188 as more clearly see in FIG. 3, includes a beading wheel rotor 236 journaled on the fixed hollow shaft 110 by means of the bearing assembly 238. Also fixed adjacent one axial end of the rotor 236 is a sprocket gear formation 240 about which a sprocket chain 242 is entrained, the opposite end of the sprocket chain 242 being entrained about a drive sprocket 244 fixed to the output of a selectively engaged gear assembly 250. A drive shaft 246 which extends along the bottom of the machine just above the base structure 52 suitably journaled adjacent the opposite axial ends thereof is provided as the input for 250. Referring to both FIGS. 3 and 30, it will be observed that the drive shaft 246 is connected to a motor 248 or any other suitable prime mover. Also connected to the end of the drive shaft 246 opposite the motor 248, is the disengageably reduction gear assembly 250 adapted to be controlled by a solenoid device 252. The output of the gear transmission 250 is thus operative to drive the beading wheel rotor 236. Accordingly, it will become apparent that when the solenoid device 252 receives the proper signal, to render the gear transmission 250 operative, the beading wheel rotor 236 will be powered in order to perform the beading operation. It will furthermore be appreciated that powered rotation of the beading wheel rotor 236 should occur as the header 184 approaches the end of its forward stroke during which time the workpiece 36 is brought into axial engagement with the beading wheels 186.

It will be observed in FIGS. 6 and 9 that the header assembly 184 is guided in its movement by means of a header carriage assembly 256 the upper portion of which includes supporting rollers 258 for guiding movement of the carriage along the track formed by the supporting beam 54. Mounted on the header carriage 256 are a pair of switch actuated projections 260 and 262. Thus, just before the header carriage 256 reaches the end of its forward stroke, the switch actuating projection 260 closes a transmission control switch 264 arranged to energize the transmission control solenoid 252 in order to engage the transmission device 250. The workpiece is thereby beaded as the header approaches the end of its forward stroke. As the header carriage engages the stop 180 at the end of its forward stroke, the switch-actuating projection 262 actuates the reverse limit switch 266 by means of which the cylinder device 220 retracts the header assembly. During the reverse movement of the header carriage 256, the transmission control switch 264 will be opened in order to disengage the transmission 250 through which the beading wheel rotor 236 is powered. It will also become apparent that when the header assembly 184 is retracted, it will withdraw the workpiece from the expansible core assembly 86 over which it has been positioned during the bending operation, the seam welding operation and the beading operation.

WORK TRANSFER OPERATION

Referring now to FIGS. 9, 28 and 29 in particular, it will be seen that a pair of clamping arms 268 are pivotally mounted on opposite longitudinal sides of the header 184. The clamping arms are pivotally mounted intermediate the ends thereof by inclined pivot assemblies 270 arranged so as to permit the gripper ends 272 of the clamp arms to engage and release the workpiece as shown in FIGS. 28 and 29. Connected to the ends of the clamp arms 268 opposite the gripping ends 272, are link members 274 which in turn are pivotally connected to meshing gear members 276 and 278. The gear member 276 is connected to the lower end of a shaft member 280 which is rotatably mounted by the bracket 282 fixed to the header carriage 256. The upper end of the shaft 280 is connected to a displaceable arm 284 adapted to be angularly displaced by a projection 286 which is fixed below the supporting beam 54. It will therefore be apparent from FIG. 28 that as the header assembly 184 is withdrawn or retracted from the expansible core assembly 86 on which the workpiece is located, the projection 286 angularly displaces the arm 284 in such a direction as to cause the gear members 276 and 278 to rotate causing the link elements 274 to displace the clamp arms in a direction to grip the workpiece 36 so that it may be subsequently withdrawn from the core assembly 86 as the header 184 is retracted to its initial position. When the header 184 reaches the end of the return stroke, it engages a limit stop 288 as shown in FIGS. 9 and 6, and also actuates a limit switch 290 as shown in FIG. 3. Actuation of the switch 290 is operative to close a control circuit for starting a new cycle of operation. It will therefore be appreciated that when the header 184 is moved forwardly in connection with the beading operation to be performed, opening of the switch 290 will occur so as to interrupt the control circuit and thereby prevent initiation of a new cycle of operations until the beading operation is completed and the header withdrawn to its initial position. It will furthermore be apparent that as the header is being withdrawn to its initial retracted position with a workpiece clamped thereto by the clamp arms 268, the projection 288 as shown in FIG. 29 will engage the arm 284 causing release of the workpiece 36 at the proper position above the inlet end 292 of the passage 56. The workpiece is thereby deposited for gravity feed transfer to the intermediate stage 24 of the machine.

Figure 4:
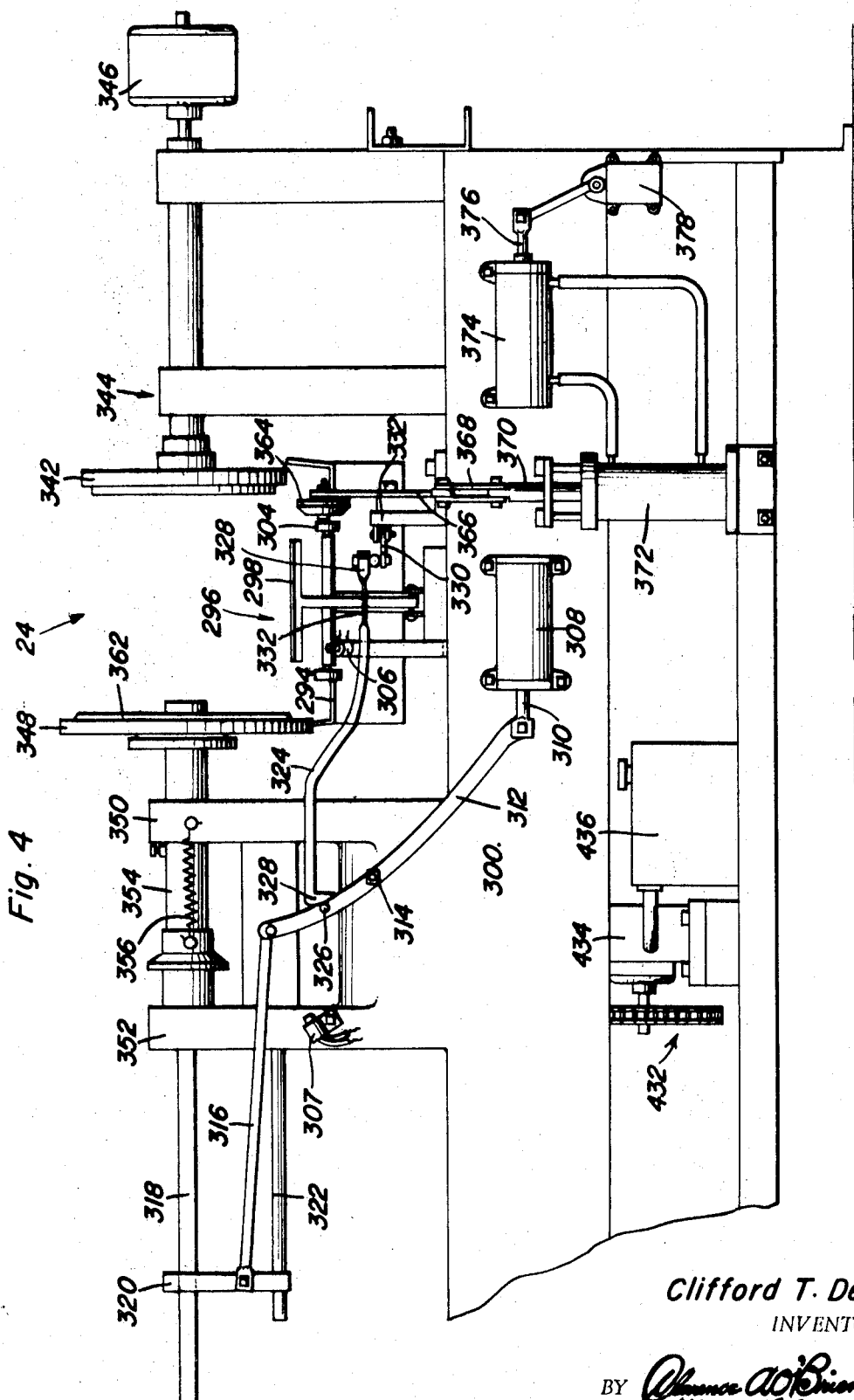
FIG. 4 is a partial sectional view taken substantially through a plane indicated by section line 4-4 in FIG. 1.

After the workpiece has undergone material-deforming operations in the stage 24 of the machine, it will be transferred to the stage 26 through a second gravity feed along a downwardly inclined passage member 294 as shown in FIGS. 1 and 2. However, transfer of the workpiece from the stage 24 to the passage member 294 is accomplished by means of a mechanical ejector mechanism so as to avoid axial movement of the workpiece in the stage 24 of the machine from a position aligned with the downwardly inclined passage member 294. Referring therefore to FIGS. 4 and 31 through 33, it will be observed that the ejector mechanism generally referred to by reference numeral 296 includes an ejector member 298 pivotally mounted on the bed assembly 300 of the intermediate stage 24 and having an upper end disposed just below the outlet end 302 of the guide passage member 56 when the ejector member 298 is in its normal position as more clearly seen in FIG. 2. Thus, the workpiece may be delivered from the passage 56 into the intermediate stage 24 without interference or obstruction from the ejector member 298 and settled therein between the ejector member 298 and a guide roller 304 yieldably mounted on the machine frame assembly 300 and disposed just below the inlet end of the delivery passage member 294. Accordingly, when a workpiece is received in the intermediate stage 24 between the ejector member 298 and the guide rollers 304, a drop-in switch 306 will be actuated in order to start operations in the intermediate stage. As a result thereof, a power cylinder device 308 is actuated, said cylinder device being mounted on the front side of the frame assembly 300 and being provided with a piston rod 310 which is extended to begin operations of the intermediate stage 24 by transferring its movement through a lever member 312 pivotally mounted by the pivot bolt assembly 314 on the front side of the machine frame assembly 300. At the end of the lever member 312 opposite the end to which the piston rod 310 is connected, a connecting pin connects the lever member to a link member 316 through which the pivotal movement imparts slidable movement to the rod member 318 for purposes to be hereafter explained. The link member 316 is therefore connected to the rod member 318 by means of a connecting member 320, the slidable movement of which is guided by a fixed rod 322 secure to the machine frame assembly 300. An ejector control member 324 having a forward hook end 328 cooperates with an engaging projection 326 on the lever member 312, the ejector control member 324 being pivotally mounted at its end portion 328 to a crank member 330. The ejector control member is thereby displaced in a vertical plane and also in a horizontal or lateral plane to accommodate angular displacement of the crank member 330 which is pivotally mounted by the bracket member 332 secured to the frame assembly 300. As shown in FIG. 4, when the cylinder device 308 is powered after actuation of the drop-in switch 306, pivotal displacement of the lever member 312 to begin operation of the intermediate stage, will have no effect on the ejector mechanism since the projection 326 on the lever member will merely pivot the ejector control member 324 in a vertical plane without causing and displacement of the crank member 330 to which it is pivotally connected. Thus, the ejector member 298 will not be displaced from its normal position. However, when operations in the intermediate stage are completed and the power cylinder device 308 is approaching the end of its return stroke as illustrated in FIG. 33, the projection 326 on the lever member 312 will engage the hook portion of the ejector control member 324 so as to cause displacement thereof in a vertical plane which can only be accommodated by angular displacement of the crank member 330 in a horizontal plane toward the ejector member 298 causing the engaging portion 332 of the ejector control member to displace the ejector control 298 against a spring bias holding the ejector member in its normal position. The workpiece is thereby displaced by the ejector member onto the delivery guide passage member 294 for transfer thereof to the final stage 26 of the machine. As the cylinder device 308 reaches the end of its stroke, the projection 326 on the lever member 312 will have cammed the portion 328 upwardly since movement of the ejector control member in a vertical plane is also accommodated whereupon the ejector control member will then return to the position illustrated in FIG. 31 in preparation for the reception of another workpiece within the intermediate stage 24. To restrict operation of drop-in switch 306 at the proper start condition of stage 24, a limit switch 307 engageable by lever 312 in its fully retracted position, is provided as shown in FIG. 5.

Figure 5:
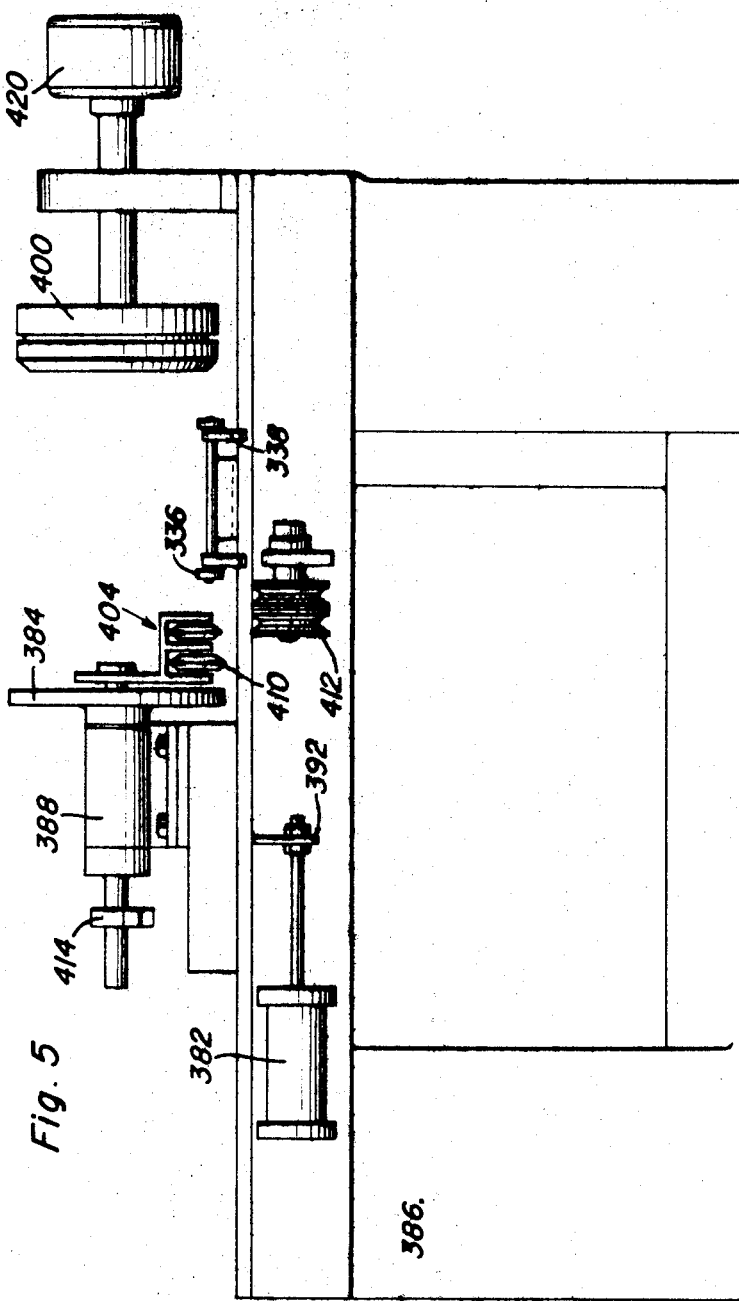
FIG. 5 is a sectional view taken through a plane indicated by section line 5-5 in FIG. 1.

The workpiece leaving the intermediate stage 24 will then be delivered to the final stage, settling between the guide rollers 334 and the guide rollers 336 as it rests on the pivotally mounted arcuate arms 338 as shown in FIGS. 1, 2 and 5. A drop-in start switch 340 is therefore also associated with the guide rollers 336 for starting operation of the final stage 26 upon settling of a workpiece therewithin.

It will therefore be apparent from the foregoing, that a workpiece 36 formed in the initial stage 14 of the machine is axially displaced from its position on the expansible core assembly 86 by the clamping arms 268 mounted on the header 184 which then release the workpiece for deposit onto the inlet end 292 of the gravity feed passage 56 for transfer to the intermediate stage 24. After settling within the intermediate stage in a position aligned with the gravity feed passage 56, the drop-in switch 306 is operated to start operation of the intermediate stage. Upon completion of the intermediate stage operation, an ejector mechanism 296 is automatically rendered operative to displace the workpiece onto the feed passage 29 from which the workpiece is deposited into the final stage, operations of which are initiated upon engagement of the drop-in start switch 340.

INTERMEDIATE STAGE

Figure 24:
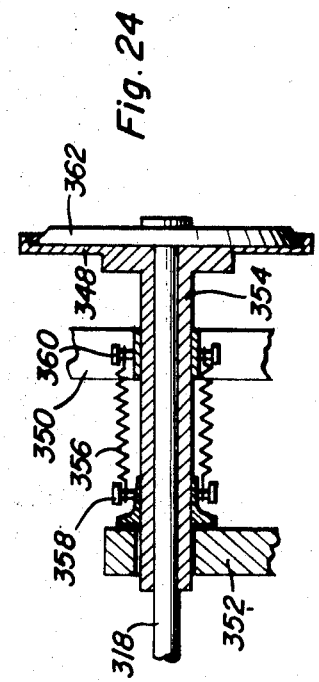
FIG. 24 is a partial sectional view taken substantially through a plane indicated by section line 24-24 in FIG. 1.

From the foregoing, it will be apparent that a workpiece is delivered to the stage 24 with its seam welded and one axial end thereof beaded. Also, it will be appreciated that the workpiece when positioned in the stage 24 will be substantially axially aligned with the drive chuck member 342 as more clearly seen in FIG. 4 so that the drive chuck member 342 may axially engage the nonbeaded end portion of the workpiece for imparting rotation thereto. The drive chuck 342 is therefore rotatably mounted by journal assemblies 344 secured to the frame 300 of the machine section 24 and is powered by means of a fluid motor 346 with which suitable controls are associated as will hereafter be explained so as to impart rotation to the drive chuck member 342 at the proper time. With reference to both FIGS. 4 and 24, it will be apparent that the beaded end 38 of the workpiece will be engaged by an idler chuck member 348 which is freely rotatably mounted between the spaced journal standards 350 and 352. Accordingly, the idler chuck member 348 is connected to one axial end of a hollow shaft member which is both freely rotatable and axially slidable against the bias of a pair of spring elements 356, the opposite ends of which are anchored to the hollow shaft 354 and the fixed standard 350, respectively, by means of the pins 358 and 360. The rod member 318 hereinbefore mentioned in connection with the operation of the ejector mechanism 296 is slidably mounted within the hollow shaft 354 and extends through and beyond the standard 352 for connection to the connector member 320 through which slidable movement is imparted to the rod member. Connected to one axial end of the rod member 318 is an inner-forming disc member 362 adapted to be axially displaced with respect to the idler chuck member 348 by means of the rod member 318. It will therefore be apparent that when the rod member 318 is in its retracted position, the inner-forming disc member 362 bearing against the idler chuck member 348 will hold the idler chuck member in a retracted position against the bias of the spring elements 356. Collars on the hollow shaft member 354 as viewed in FIG. 24 will therefore limit axial movement of the idler chuck member 348 and the inner-forming disc member 362 to a predetermined retraction position. When the power cylinder device 308 is energized as hereinbefore indicated, the rod member 318 will be displaced in a forward direction so as to axially move the inner-forming disc member 362 into the cylindrical workpiece as diagrammatically illustrated in FIG. 18, thereby releasing the idler chuck member 348 so that the spring elements 356 may bias the workpiece through the idler chuck member into engagement with the drive chuck member 342. Subsequent powering of the drive chuck member 342 will be thereby effective to impart rotational movement to the workpiece so that when the inner-forming disc member 362 is disposed at the end of its forward stroke, as diagrammatically illustrated in FIG. 19, an outer forming wheel 364 disposed in alignment therewith may be brought into engagement with the workpiece so as to neck and flange the portion 46 of the workpiece. The outer forming wheel 364 is therefore mounted at the free end of a lever member 366 pivotally mounted on the pivot bracket 332 the other end of the lever member 366 being connected through a link assembly 368 to a piston rod 270 which projects out of the power cylinder device 372. Hydraulically connected to the power cylinder device 372, is a reversing ram device 374 the piston rod 376 of which is connected to a reverse control switch 378. The control switch 378 is thereby operative to stop operations and restore the stage 24 to its initial condition as will be hereafter explained. It will be appreciated that the fluid motor 346 will be energized just before the outer forming wheel 364 engages the workpiece and after a predetermined delay period during which the material deformation takes place, the reversing ram device 374 may then be operative through the control mechanism 378 to stop powered drive of the drive chuck. 342. It will therefore be apparent from the foregoing that in the intermediate stage, the workpiece is prepared by a necking and flanging operation for final assembly in the final section 26 of the machine.

FINAL STAGE

When the workpiece is received within the final section 26 of the machine, and closes the drop-in start switch 340 as hereinbefore indicated, a power cylinder device 382 is energized. The cylinder device 382 as shown in FIGS. 1, 5 and 25, is positioned rearwardly of and below an idler chuck member 384 by being fixedly mounted in proper position with respect thereto on the machine frame 386 of the final section 26. A slide support 388 is therefore fixedly mounted on the machine frame 386 for slidably supporting a shaft member 390 having a downwardly projecting arm 392 at a rear end thereof to which the piston rod 394 extended from the power cylinder device 382, is connected. Accordingly, when the cylinder device 382 is energized following closing of the drop-in start switch 340, the idler chuck 384 is axially displaced into engagement with the beaded end portion 38 of the workpiece. The idler chuck 384 is therefore loosely mounted for rotation on the shaft 390 between the axial thrust member 396 and an adjustable eccentric mechanism 398. In this manner, the idler chuck 384 is effective to displace the workpiece in an axial direction toward a magnetic drive chuck 400 on which the lid part 40 has been positioned as indicated diagrammatically in FIG. 20.

The variable eccentric mechanism 398 connected to the end of the shaft 390 includes a slide head 402 which slidably mounts an internal swaging assembly 404 adapted to be radially displaced by means of an eccentric 406 secured to one axial end of a control shaft 408 that extends through the hollow shaft 390 as more clearly seen in FIG. 25. Rotatably mounted by the swaging head assembly 404 are a plurality of swaging wheels 410. Thus, when the swaging wheels 410 are aligned with external forming wheels 412 at the end of the forward stroke of the shaft 390, radial displacement of the swaging head 404 into engagement with the cylindrical wall of the workpiece, will swage the workpiece or form corrugations therein as diagrammatically shown in FIG. 21A. Accordingly, radial displacement of the swaging head 404 is effected by angular displacement of the eccentric 406 and the shaft 408 connected thereto. An arm 414 is therefore fixed to the shaft 408 rearwardly of the supporting guide 388 and is biased by the spring element 416 to one angular position so as to normally hold the swaging head 404 in a radially retracted position. Connected to the arm 414 for angular displacement thereof is the piston rod of a power cylinder device 418 which is disposed in laterally spaced relation to the shaft 408 as shown in FIG. 1. Thus, actuation of the cylinder device 418 so as to radially displace the swaging head into engagement with the workpiece occurs at the end of the forward stroke of the cylinder device 382, to thereby deform the workpiece material between the swaging wheels 410 and the wheels 412 which are rotatably mounted in fixed relation on the machine frame 386. It will be appreciated, of course, that the swaging operation requires that the workpiece be rotated for which reason a fluid motor 420 is drivingly connected to the drive chuck 400 with which the workpiece is engaged.

LID-SEAMING OPERATION

Figure 20:
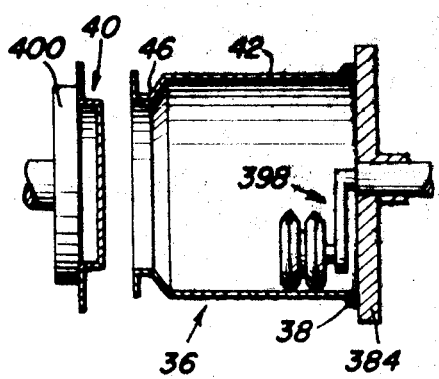
FIGS. 20 and 21 (A and B) are diagrammatic illustrations of the operational phases in the final stage of the automatic machine wherein the workpiece is swedged and double seamed to a lid at one end.
Figure 21A:
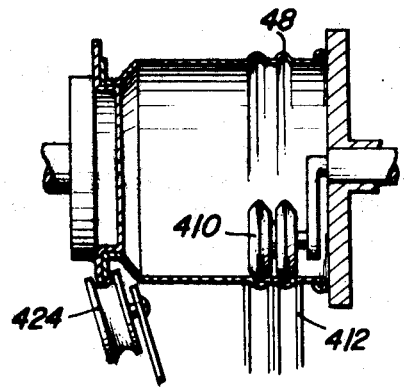
Figure 21B:
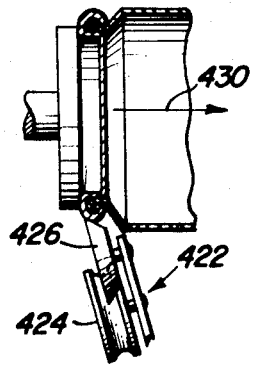

It will be noted from FIGS. 20 and 21 that the lid 40 is positioned in any suitable manner on the magnetic drive chuck 400 so that it will abut against the flange of the portion 46 of the workpiece as shown in FIG. 21A. As seen in FIG. 1, a double seaming wheel assembly 422 is mounted for angular displacement in a plane disposed at an acute angle to the rotational plane of the drive chuck 400 whereby a beading wheel 424 is initially brought into engagement with the flanges on the lid 40 and the portion 46 of the workpiece for initial folding of the flange on the lid 40 about the flange on the portion 46 as shown in FIG. 21A. Continued angular displacement of the assembly 422 displaces the beading wheel 424 out of engagement and brings the folding wheel 426 into engagement with the lid flange as shown in FIG. 21 in order to fold both flanges into a seam for securing the lid to the workpiece. It will therefore be appreciated that angular displacement of the assembly 422 and retraction thereof will be effected by a power cylinder device similar to those heretofore described in connection with the other operations, which cylinder device is diagrammatically illustrated in FIG. 10 and referred to by reference numeral 428. When the cylinder device 428 retracts the assembly 422 from the position illustrated in FIG. 21B, an axial thrust component will be applied to the completed workpiece as indicated by the arrow 430 in view of the rotational torque applied to the workpiece by the drive chuck, causing the workpiece to be axially displaced against the magnetic holding force of the drive chuck. In this manner, the completed workpiece is released from the final section of the machine, it being appreciated that the axial displacement referred to occurs after the workpiece has been released by the idler chuck 384.

DRIVE ARRANGEMENT

Referring now to FIG. 30, it will be observed that the drive shaft 246 hereinbefore referred to in connection with the solenoid control reduction gear transmission 250 for operating the beading wheel assembly 188, is connected to the motor 248 which also constitutes a power source for the other powered components of the machine. Accordingly, the drive shaft 246 is drivingly connected by means of a sprocket drive 432 to a pump mechanism 434 drawing fluid from a reservoir 436 to be discharged into a line 438 constituting part of a hydraulic and electrical control system with which the aforementioned hydraulic cylinder devices and control switch devices are associated. Also drivingly connected to the drive shaft 246 by the gearing 440 is a pump mechanism 442 establishing a pair of closed hydraulic circuits 444 and 446 for operation of the fluid motors 346 and 420, respectively associated with the intermediate and final sections 24 and 26 of the machine. The fluid motors 346 and 420 are therefore rendered operative upon opening of the control valves 447 and 448 to power the drive chucks 342 and 400 as hereinbefore indicated. It will, of course, be appreciated that other suitable drive arrangements may be resorted to for purpose of powering the beading wheel assembly 188, and supplying motivating energy to the drive chucks 342 and 400 and for supplying the motivating medium to control the sequential operations of the machine.

HYDRAULIC-ELECTRICAL CONTROL SYSTEM

Referring now to FIG. 10, the hydraulic and electrical control system by means of which the various components of the machine are operatively interrelated, is shown. Accordingly, the pump mechanism 434 discharging fluid under pressure into line 438 drawn from the sump 436, is hydraulically connected to the power cylinder devices hereinbefore mentioned in connection with the various components and operations of the machine. Thus, the pump 434 constitutes a fluid source of power in connection with the power cylinder devices. Also, an electrical source of power is provided by a pair of power lines 450 and 452 through fuses 454 and a start and stop switch 456 which may be mounted in any suitable location on the machine. Assuming that the electrical source of power is an AC source, the power lines 450 and 452 are connected to the primary 458 of a transformer 460, the secondary 462 of which is connected to the welder electrodes including the anode and cathode elements 124 and 126 hereinbefore mentioned. The primary circuit is, however, intermittently opened and closed by means of the relay switch 464 controlled by the relay 466 which in turn is intermittently energized and deenergized by an interrupter switch 468 adapted to be controlled by the switch actuator 470 driven in any suitable manner as, for example, by the welder cathode carriage 170. This interrupter switch 468 therefore electrically connects the relay 466 to a DC source of power supplied by the conductors 472 and 474 which derive electrical power from the AC power lines 450 and 452 through the rectifier and filter circuit 478. It will therefore be observed that the relay control circuit for the relay 466 may be opened and closed by means of the welder return cycle switch 212 actuated by the sprocket chain 202 and control lever 208 in proper phase relation to the welder carriage movement as hereinbefore indicated. Also, control over the drive transmission 250 for operating the beading wheel assembly will be exercised by the opening and closing of the drive control switch 264 actuated in accordance with the position of the header carriage as hereinbefore mentioned. The DC power lines 472 and 474 are connected in parallel to a plurality of reverse operating solenoid valve actuators 476, 478, 480, 482 and 484. Each of the solenoid valve actuators is associated with a reversible valve mechanism including the valve mechanisms 486, 488 and 490 associated with the initial section 14 of the machine and the valve mechanisms 492 and 494 respectively associated with the intermediate and final sections 24 and 26 of the machine. Accordingly, the discharge line 438 of the pump 434 is connected in parallel to each of the valve mechanisms through cutoff valves 496, 498, 500, 502 and 504. Also associated with each of the valve mechanisms and connected thereto in parallel is a fluid return line 506 connected to the sump 436. It will therefore be appreciated that when each of the reversible valve mechanisms is in one operative condition, fluid under pressure may be supplied therethrough to a supply line while an exhaust line will be connected to the return line 506. In the other operative condition of each of the valve mechanisms, the exhaust line will be connected to the discharge pressure line 438 while the supply line will be connected to the return line 506. In this manner the valve mechanism effects a reverse action with respect to the hydraulic cylinder devices with which they are associated.

It will therefore be observed from FIG. 1 that the valve mechanism 486 is connected to the supply line 508 for supplying fluid under pressure thereto when one of the solenoid coils of actuator 476 is energized by an actuating circuit. The supply line 508 will thereby be operative to immediately actuate the stock cutting cylinder device 78 while actuation of the bending die cylinder device 100 will occur only after a predetermined delay interval in view of the restriction 510 which connects the supply line 508 to the cylinder device 100. Energization of the appropriate coil of solenoid 476 for displacing the valve mechanism 486 into an operative condition occurs when the sheet material limit switch 72 mounted at the rear end of the sheet material receiver 62 is closed, the switch 72 being a normally open switch. Also, in the same solenoid energizing circuit with the switch 72 is a normally open beading header return and cycle start switch 290 which is held closed by the header 184 in its initial retracted position as hereinbefore indicated. Upon operation of the die-bending cylinder device 100, limit switch 72 is restored to its normally open position deenergizing the solenoid coil of actuator 476. When the normally open welder reverse switch 178 is closed at the end of the welder carriage forward stroke, a reverse energizing circuit for the appropriate solenoid coils of actuators 476 and 478 are established to displace the valve mechanism 486 in the opposite direction, reversing the hydraulic connections to thereby pressurize the exhaust line 512 and connect the supply line 508 to the return line 506. In this manner the power cylinder devices are normally returned to their initial positions. With respect to the cylinder devices 78 and 100, it will be observed that an interlock 514 is provided so that when the cylinder device 100 is pressurized through the supply line 508 after a predetermined delay with respect to pressurization of the cylinder device 78, a dump valve 516 is closed so as to hold the cylinder device 78 hydraulically locked in its extended condition insuring that bending is completed before the material receiver 62 is displaced away from the expansible core assembly 86. Also operatively connected to the interlock 514, is the control switch 96. The control switch is normally open so that only after a predetermined displacement of the bending die cylinder device 100, will it close to establish aforementioned energizing circuit through one coil of solenoid 478 to displace the valve mechanism 488 into one of its operative conditions, thereby preventing energization of the solenoid 478 before completion of the cutting and bending operations. Upon energization of the solenoid 478, the supply line 516 will be pressurized so as to simultaneously pressurize the core expander cylinder device 106, the cathode-positioning cylinder device 168 and the anode contactor cylinder device 156. Thus, the workpiece will be firmly held in position as bending of the material is completed and the welding electrodes are moved into operative positions. After a predetermined delay, the welder carriage device 176 is pressurized through the restriction 518 so as to begin the forward welding stroke of the welding apparatus. Inasmuch as the capacity of the cylinder device 176 is relatively large, movement of the welder carriage will be retarded so that the cathode moves at the proper low speed for producing the welding seam. Also, by virtue of the restriction 522 in the exhaust line 520, upon reverse of the valve mechanism 488, return movement of the welder carriage will be delayed. However, upon reverse movement of the valve mechanism 488 by reverse energization of the solenoid 476 upon closing of the welder reverse switch 178, the core expander cylinder device 106 and the electrode-positioning cylinder devices 168 and 156 will be immediately contracted together with contraction of the cylinder devices 78 and 100 since closing of the welder reverse switch 178 also energizes the reverse energizing circuit for the valve solenoid 476.

It will be observed that an interlock 524 has been provided between the anode contactor cylinder 156 and the beading interlock switch 182 which is normally open. Accordingly, only after electrical contact is removed from the anode element of the welding apparatus, will the beading interlock switch 182 be closed so as to condition an energizing circuit for the valve solenoid 480. Thus, during the reverse movement of the welder carriage, closing of the header control switch 220 would complete the energizing circuit through the valve solenoid 480 in order to displace the valve mechanism 490 to an operative position wherein the supply line 526 is pressurized so as to immediately pressurize the header cylinder device 222. The header is thereby rapidly displaced into engagement with the workpiece until the last three-fourth inch of travel which is then retarded by a cushion element 528 so as not to split the metal during the beading operation. It will be appreciated that when the header is so displaced from its initial position, the switch 290 will be opened so as to prevent a new cycle from starting until the header is once again returned to its retracted position. When the header reaches the end of its forward stroke, the normally open switch 266 is closed so as to energize the other coil of the solenoid 480 for reverse actuation of the valve mechanism 490. The header is then returned to withdraw the workpiece from the expansible core assembly and depositing it at the proper location for transfer to the intermediate stage of the machine.

When the workpiece reaches the intermediate stage of the machine, it will close the normally open drop-in switch box in series with switch 307 to energize a circuit through the delay relay 534. Any suitable time delay device 536 is therefore associated with the relay 534 so as to disclose the normally open start switch 538 only after a predetermined delay period following closing of the drop-in switch 306 in order to permit the workpiece to become stabilized. Thus, when the start switch 538 is closed, an energizing circuit is established through one coil of the valve solenoid 482 for displacement of the valve mechanism 492 in one direction so as to pressurize the supply line 540. The cylinder device 308 for axially displacing the inner necking and flanging forming disc 362, is then immediately pressurized while the cylinder device 372 for the outer forming wheel is pressurized after a first predetermined delay period by virtue of the connection of the supply line 540 to the cylinder device 372 through the restriction 542. After a still further delay period, sufficient to permit completion of the material-deforming operation effected through the cylinder devices 308 and 372, the reversing ram device 374 is pressurized through the restriction 544. I will be observed, however, that the interlock 546 operates in response to initial displacement of the cylinder device 372 to open the valve mechanism 447 in order to initiate drive of the chuck through the fluid motor 346 with which the valve device 447 is associated. Thereafter, closing of the valve 447 occurs by actuation of the reversing ram device 374 also connected to the interlock 546 so as to stop powered rotation of the chuck. When the reversing ram device 374 is actuated it also closes the normally open switch 378 so as to establish an energizing circuit through the other coil of valve solenoid 482 for displacing the valve mechanism 492 in the other direction whereupon the exhaust line 548 is pressurized and the supply line 540 vented causing retraction of the cylinder devices 308, 372 and 374. The workpiece is thereby released from between the idler chuck and the drive chuck and is transferred by the ejector mechanism 296 to the final stage of the machine.

When the workpiece settles within the final stage of the machine, the drop-in start switch 340 is closed so as to establish an energizing circuit through one coil of the valve solenoid 484 to displace the valve mechanism 494 into one operative condition pressurizing the supply line 550. The cylinder device 382 for axially displacing the idler chuck is promptly pressurized. After a predetermined delay period, the cylinder device 418 is pressurized through the restriction 552 for radially displacing the swaging head into engagement with the inner walls of the workpiece as hereinbefore indicated. After a further predetermined delay period, the cylinder device 428 is energized through the restriction 554 in order to effect the double seaming operation hereinbefore described. It will be observed, however, that the cylinder device 382 and 428 are operatively interconnected through an interlock 558 with the chuck drive control valve 448 associated with the fluid motor 420. Accordingly, only after the idler chuck has been displaced by the cylinder device 382 for axially engaging the workpiece with the drive chuck and for axially positioning the swaging head into alignment with the outer forming wheels 412, will the valve 448 be opened so as to render the fluid motor 420 operative to drive chuck 400. The control valve 448 will then be closed for discontinuing the chuck drive when the cylinder device 428 completes its stroke and the double seaming operation associated therewith. Also, when the cylinder device 428 completes this forward operative stroke, it closes the normally open limit switch 558 establishing the reverse energizing circuit through the other coil of valve solenoid 484 thereby actuating the valve mechanism 494 to its other operative position, pressurizing the exhaust line 560 and restoring the final stage to its initial condition.

Figure 34:
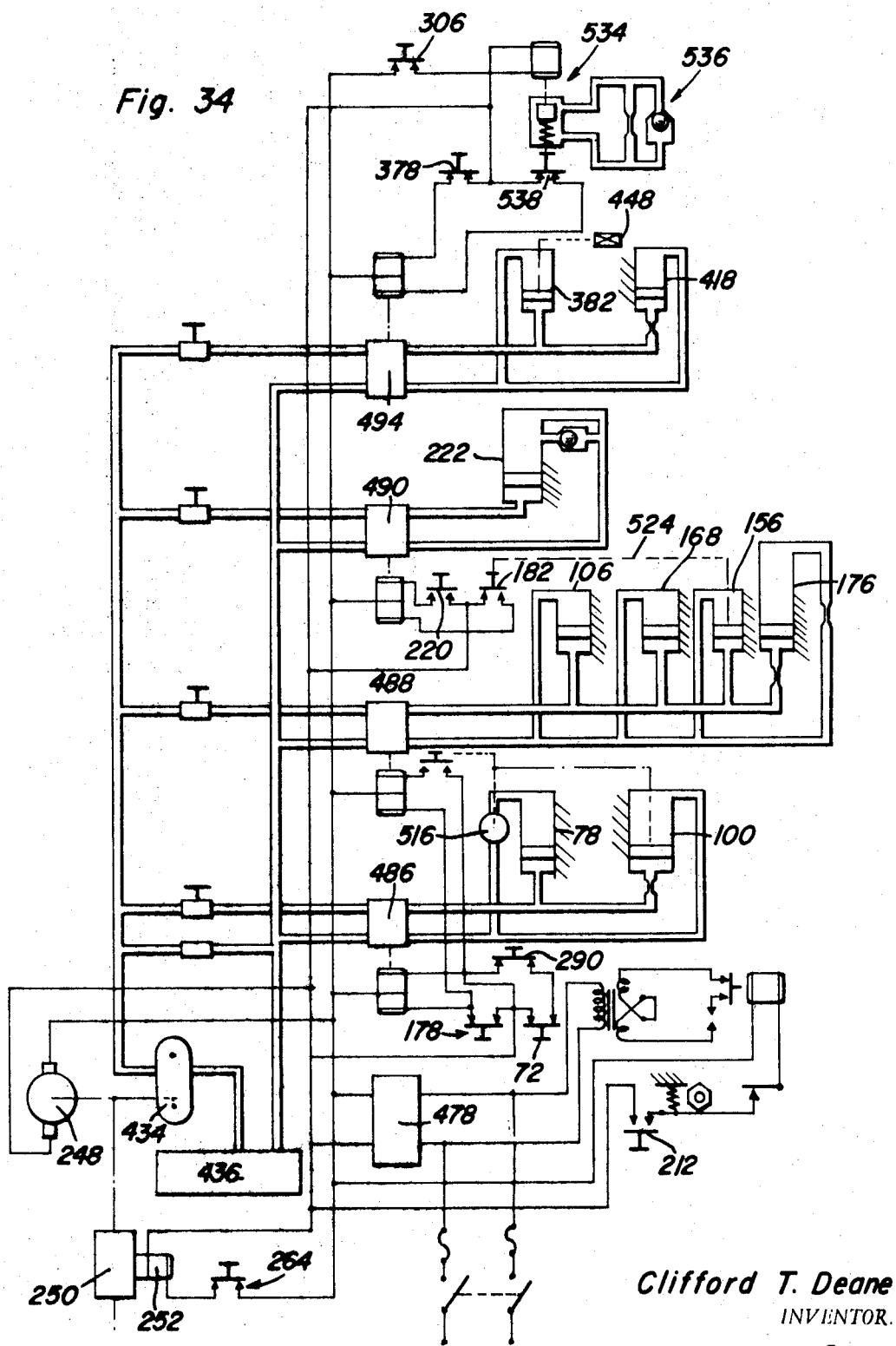
FIG. 34 is a control circuit diagram associated with a modified form of automatic machine.

In FIG. 34, an electrical hydraulic control circuit is illustrated which is the same as that of FIG. 10 except for the elimination of the necking and flanging, and seaming operations. Also, the drop-in delay feature associated with the intermediate stage has been retained in connection with the portion of the final stage retained wherein the swaging operation is performed. The machine with which the control circuit of FIG. 34 is associated will therefore have two stages including the first stage which is identical to the initial stage 14 as hereinbefore described, and a second stage wherein only the swaging operation is performed. The machine of this type may therefore be useful in connection with the formation of cylinder having corrugated sidewalls. It will therefore be appreciated, that the machine of the present invention may be modified without departing from the underlying principles by selective removal of certain operations or adding of additional material-deforming operations.

OPERATION

From the foregoing description, operation of the machine may be summarized with particular reference to FIG. 10. Upon actuation of the start switch 456, the motor 248 will be energized so as to drive the pump mechanism 434 providing the fluid motivating medium for the hydraulic control circuit. Also, the motor will supply the input power for the gear transmission 250 when rendered operative by the solenoid control 252. Sheet stock from the material storage may then be fed into the receiver 62 in any suitable manner closing the switch 72 and causing pivotal displacement of the receiver. The stock is thereby cut off and the first stage solenoid 476 energized to actuate the first reversing valve 486 to immediately pressurize the cutoff cylinder device 78 and thereafter actuate the bending die cylinder 100 following a predetermined delay period during which the stock is sheared.

The stock is then held in displaced position by the receiver by closing of the valve 516 through the interlock 514 as the stock is bent by the bending die members about the expansible core assembly which is expanded in the meantime by the cylinder device 106 simultaneously with the positioning of the welding electrodes by the cylinder devices 168 and 156. Sequential and/or overlap operation is controlled by the control switch 96. Thereafter the welder carriage is moved through its stroke by the cylinder device 176 so as to weld a seam along the abutting edges of the workpiece held in place on the expanded core assembly 86 by the bending dies. Also, when the welding electrodes are operatively positioned, the beading cutoff switch is opened to prevent closing of the control circuit for the beading operation to follow. When the welder carriage reaches the end of its forward stroke, actuation of the welder reverse switch 178 reverses the valve mechanisms 486 and 488 to immediately retract the cylinder devices 78, 100, 106, 168 and 156. Retraction of the anode-positioning cylinder 156 then closes the beading interlock switch through the interlock 524 so as to condition the beading control circuit only after completion of the welding operation. Also during return movement of the welder carriage, cycle switch 212 is opened by the sprocket chain actuator drivingly connected to the welder carriage to cut off the welding power circuit while another carriage driven actuator closes the header control switch 220 of the header control circuit previously conditioned by the closing of the beading interlock switch 182 to actuate the third valve mechanism 494 of the first stage section of the machine.

As a result, the beading header 184 is rapidly advanced into engagement with the workpiece during the reverse movement of the welder carriage. Before the end of the header stroke, the header closes the transmission control switch 264 to effect drive of the beading wheel assembly so that during the last-cushioned portion of the header travel, the open end of the workpiece is engaged and beaded by the beading wheel. As the header approaches the end of its forward stroke, the header reverse limit switch 266 is closed so as to cause retraction of the header while the header clamp arms engage the workpiece for withdrawal thereof. As the header is retracted, withdrawing the work therewith from the core assembly, the transmission control switch 264 is open to stop drive of the beading wheels. The header carriage on reaching the end of its reverse movement, closes the switch 290 so as to permit another cycle to begin. Thus, the formed workpiece, seam welded and beaded is withdrawn by the header and released onto the gravity feed for transfer to the second stage of the machine actuating a drop-in limit switch 306 to close an energizing circuit through a delayed action device 536 permitting the workpiece to stop vibrating before the material-deforming operations of the intermediate stage beings.

Thereafter, the valve mechanism 492 is actuated so as to immediately pressurize an inner-forming disc cylinder 308 for axial displacement of the inner-forming disc through the workpiece into abutting relation with the drive chuck at which time a valve control 447 is engaged to impart drive to the drive chuck through the fluid motor 346. Axial displacement of the inner-forming disc permits the springs 356 to bias the idler chuck for bringing the workpiece into driving engagement with the drive chuck in order to impart rotation to the workpiece. After a predetermined delay period, a necking and flanging wheel is brought into engagement with the workpiece by means of the cylinder device 372. After a still further delay, the reversing ram device 374 is pressurized to stop operation of the fluid motor and actuate a reversing limit switch 378 in order to reverse the valve solenoid 482 causing all of the cylinder devices associated with the intermediate stage to be rapidly unloaded for retraction of the dements connected thereto. As a result of the retraction of the cylinder device 308, the ejector mechanism 296 is rendered operative to displace the workpiece from the intermediate stage toward the final stage.

When entering the final stage, the drop-in start switch 340 is actuated to initiate the operation within the final stage. As a result thereof, the idler chuck cylinder device 382 is immediately pressurized so as to cause engagement of the beaded end of the workpiece, displacing the workpiece into engagement with the flanged lid 40 positioned in any suitable manner on a magnetic drive chuck at the other end. After a first delay period, the swaging control cylinder device 418 is pressurized to angularly displace an eccentric mechanism 398 for radially displacing a swaging head 404 into engagement with the workpiece internally thereof. Prior thereto, the chuck drive control valve 448 is opened by the idler chuck control cylinder device 382 so as to impart rotation to the workpiece, the chuck drive being disengaged upon completion of the double seaming operation by the cylinder device 428. The double seaming operation by the cylinder device 428 occurs however after a further delay period following the swaging operation. At the end of the lid-seaming operation, the torque relationship between the rotating workpiece and the forming wheel 426 is such as to cause the workpiece to be axially ejected from the magnetic chuck while actuation of the reverse limit switch 558 restores the final stage to its start condition.

It will be appreciated from the foregoing that the automatic formation of drums, cans or other similar articles may be accomplished in a rapid manner particularly since two operational cycles may occur in overlapping relation to each other limited only by transfer of the workpiece from the initial stage before the next operational cycle begins. Also, it will be appreciated that automatic operation may be selectively restricted or expanded so as to meet different requirements.

I claim:

1. An automatic machine for producing a tubular member such as a drum, can or the like from sheet material, comprising: material-receiving means into which the sheet material is fed in a feed direction, blank cutting means operative in response to reception of a predetermined length of continuous sheet material in the receiving means for pivotally displacing the receiving means to cut off said length of sheet material, a mandrel, bending means operatively mounted by the material-receiving means for bending said length of sheet material about said mandrel into a tubular workpiece having abutting edges, welding electrode means rendered operative to weld a seam along said abutting edges held stationary by the bending means, beading means axially engageable with the tubular workpiece upon advance of the tubular workpiece in one axial direction transverse to said feed direction to bead one axial end of the workpiece, clamp means operatively connected to the beading means for withdrawal of the workpiece from the bending means in the opposite axial direction, transfer means operative to roll the workpiece delivered thereto by the clamp means to a plurality of predetermined stations, chuck means engageable with said workpiece at an axial end opposite said one axial end to impart rotational movement thereto at each of said predetermined stations, and material-deforming means engageable with said workpiece for performing different operations thereon in response to rotation of the workpiece at each of said predetermined stations.

2. The combination of claim 1 wherein said transfer means comprises delay start means operatively mounted adjacent said material deforming means to prevent operation thereof until movement of the workpiece has stopped at one of said predetermined stations and ejector means operatively engageable with said workpiece following material deforming thereof for displacement of the workpiece into another of said predetermined stations.

3. An automatic machine for producing a tubular member such as a drum, can or the like from sheet material, comprising: material-receiving means into which the sheet material is fed in a feed direction, blank cutting means operative in response to reception of a predetermined length of continuous sheet material in the receiving means for pivotally displacing the receiving means to cut off said length of sheet material, a mandrel, bending means operatively mounted by the material receiving means for bending said length of sheet material about said mandrel into a tubular workpiece having abutting edges, welding electrode means rendered operative to weld a seam along said abutting edges held stationary by the bending means, beading means axially engageable with the tubular workpiece upon advance of the tubular workpiece in one axial direction transverse to said feed direction to bead one axial end of the workpiece, clamp means operatively connected to the beading means for withdrawal of the workpiece from the bending means in the opposite axial direction, transfer means operative to roll the workpiece delivered thereto by the clamp means to a plurality of predetermined stations, chuck means engageable with said workpiece at an axial end opposite said one axial end to impart rotational movement thereto at each of said predetermined stations, and material-deforming means engageable with said workpiece for performing different operations thereon in response to rotation of the workpiece at each of said predetermined stations, said blank cutting means comprises a fixed blade and power operated means for displacement thereof with the continuous sheet of material toward said fixed blade to shear the sheet of material, and means responsive to completion of said welding seam for retracting said material-receiving means from the fixed blade.

4. The combination of claim 3 wherein said material-deforming means includes swaging means sequentially projected into said workpiece through said one axial end to render said chuck means operative at one of said predetermined stations and radially displaced thereafter into engagement with the workpiece to form corrugations thereon.

5. The combination of claim 4, wherein said material-deforming means further includes means for necking and flanging said workpiece adjacent said opposite axial end thereof in another of said predetermined stations, and double seaming means operatively engageable with said opposite axial end of the tubular workpiece for securing a lid to the tubular workpiece subsequent to the formation of said corrugations by the swaging means.

6. The combination of claim 5 wherein said transfer means comprises delay start means operatively mounted adjacent said necking and flanging means to prevent operation thereof until movement of the workpiece has stopped at one of said predetermined stations and ejector means operatively engageable with said workpiece following necking and flanging thereof for displacement of the workpiece into said predetermined station for swaging and double seaming of a lid thereon.

7. An automatic machine for producing a tubular member such as a drum, can or the like from sheet material, comprising: material-receiving means into which the sheet material is fed in a feed direction, blank cutting means operative in response to reception of a predetermined length of continuous sheet material in the receiving means for pivotally displacing the receiving means to cut off said length of sheet material, a mandrel, bending means operatively mounted by the material-receiving means for bending said length of sheet material about said mandrel into a tubular workpiece having abutting edges, welding electrode means rendered operative to weld a seam along said abutting edges held stationary by the bending means, beading means axially engageable with the tubular workpiece upon advance of the tubular workpiece in one axial direction transverse to said feed direction to bead one axial end of the workpiece, clamp means operatively connected to the beading means for withdrawal of the workpiece from the bending means in the opposite direction, transfer means operative to roll the workpiece delivered thereto by the clamp means to a plurality of predetermined stations, chuck means engageable with said workpiece at an axial end opposite said one axial end to impart rotational movement thereto at each of said predetermined stations, and material-deforming means engageable with said workpiece for performing different operations thereon in response to rotation of the workpiece at each of said predetermined stations, said welding electrode means comprising electrode-positioning means rendered operative in overlapping relation to operation of the bending means, electrode-moving means operatively mounting one of said electrodes for movement through a predetermined stroke along said abutting edges of the workpiece after a predetermined interval following contact of the workpiece by the pair of electrodes, and means operatively connected to said electrode positioning means and responsive to completion of said predetermined stroke of the electrode-moving means to retract said pair of electrodes and reverse movement of the electrode-moving means.

8. An automatic machine for producing a tubular member such as a drum, can or the like from sheet material, comprising: material-receiving means into which the sheet material is fed in a feed direction, blank cutting means operative in response to reception of a predetermined length of continuous sheet material in the receiving means for pivotally displacing the receiving means to cut off said length of sheet material, a mandrel, bending means operatively mounted by the material-receiving means for bending said length of sheet material about said mandrel into a tubular workpiece having abutting edges, welding electrode means rendered operative to weld a seam along said abutting edges held stationary by the bending means, beading means axially engageable with the tubular workpiece upon advance of the tubular workpiece in one axial direction transverse to said feed direction to bead one axial end to the workpiece, clamp means operatively connected to the beading means for withdrawal of the workpiece from the bending means in the opposite direction, transfer means operative to roll the workpiece delivered thereto by the clamp means to a plurality of predetermined stations, chuck means engageable with said workpiece at an axial end opposite said one axial end to impart rotational movement thereto at each of said predetermined stations, and material-deforming means engageable with said workpiece for performing different operations thereon in response to rotation of the workpiece at each of said predetermined stations, said beading means comprising header means rendered operative for engagement with the tubular workpiece at said opposite axial end for axial displacement of the workpiece, conditioning means operatively connected to the welding electrode means to prevent operation of the header means until said welding seam is completed, heading control means drivingly connected to said electrode-moving means to render the header means operative, beading wheel means engageable by said workpiece at said one axial end in response to displacement by the header means, and means responsive to a predetermined displacement of the workpiece for withdrawal of the header means in the opposite direction.

9. The combination of claim 8, wherein said clamp means comprises a pair of clamp arms movably mounted on the header means for gripping engagement with the workpiece, and means responsive to movement of the header means for sequentially displacing said clamp arms into engagement with the workpiece for withdrawal thereof with the header means and release of the workpiece into said transfer means.

10. An automatic machine for producing a tubular member such as a drum, can or the like comprising, material-receiving means into which the material is fed in one direction, blank cutting means operative in response to reception of a predetermined length of continuous sheet material in the receiving means to cut off said length of said material, bending means operatively mounted by the material receiving means for forming said length of sheet material into a tubular workpiece, said cutting means comprising a fixed blade and power-operated means operatively connected to the material-receiving means for displacement thereof transverse to said one direction with the continuous sheet of material toward said fixed blade to shear the sheet of material and operatively positioning the material with respect to the bending means.

11. An automatic machine for producing a tubular member such as a drum, can or the like comprising, welding means rendered operative on a tubular workpiece to weld a seam along abutting edges thereof, beading means axially engageable with the workpiece upon retraction of the welding means therefrom to bead one axial end of the workpiece, and clamp means operatively connected to the beading means, said beading means comprising header means rendered operative for engagement with the tubular workpiece at an axial end opposite said one axial end for axial displacement by the header means, and means responsive to a predetermined displacement of the workpiece in said one direction for beading said one axial end and withdrawing the workpiece from the welding means by said clamp means.

12. In a machine for forming a shaped article from a sheet of material, a mandrel having a fixed longitudinal axis, a receiver into which the sheet of material is fed in one direction transverse to said axis, means for displacing the receiver toward the mandrel to bring the sheet of material into contact with the mandrel, means for folding the sheet of material while in contact with the mandrel to form a tubular workpiece, clamp means engageable with the workpiece adjacent one axial end for axial withdrawal thereof from the mandrel, transfer means for guiding movement of the workpiece withdrawn from the mandrel along a path generally parallel to and spaced from said one direction, and means for interrupting said movement of the workpiece along said path at a deforming station.

13. The combination of claim 12 including means for beading the workpiece at an end opposite said one axial end while on the mandrel.

14. In a machine for forming a shaped article from a flat sheet of material, a mandrel having a fixed longitudinal axis, a receiver into which the flat sheet of material is fed in one direction transverse to said axis, means for displacing the receiver toward the mandrel to bring the sheet of material into contact with the mandrel, means for folding and seaming the sheet of material in contact with the mandrel to form a tubular workpiece, clamp means engageable with the workpiece adjacent one axial end for axial withdrawal thereof from the mandrel, transfer means for guiding movement of the workpiece withdrawn from the mandrel along a path generally parallel to and spaced from said one direction, and means for interrupting said movement of the workpiece along said path at a deforming station, means for flanging said one axial end of the workpiece at the deforming station.

15. A machine for producing a tubular member from sheet material comprising receiving means into which the sheet material is fed, a mandrel fixedly mounted in spaced relation to the material-receiving means, means for displacing the receiving means toward the mandrel to bring the sheet material into contact therewith, fixed blade means operatively positioned in relation to the receiving means for severing a blank from the sheet material in response to said displacement of the receiving means, and bending means operatively connected to the receiving means for folding the severed blank about the mandrel when in contact therewith.